(12) United States Patent
Miyasaka et al.

(10) Patent No.: US 10,993,060 B2
(45) Date of Patent: Apr. 27, 2021

(54) ACOUSTIC SIGNAL PROCESSING DEVICE AND ACOUSTIC SIGNAL PROCESSING METHOD

(71) Applicant: SOCIONEXT INC., Kanagawa (JP)

(72) Inventors: Shuji Miyasaka, Yokohama (JP); Kazutaka Abe, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/831,421

(22) Filed: Mar. 26, 2020

(65) Prior Publication Data
US 2020/0228909 A1 Jul. 16, 2020

Related U.S. Application Data

(63) Continuation of application No. PCT/JP2018/022385, filed on Jun. 12, 2018.

(30) Foreign Application Priority Data

Sep. 28, 2017 (JP) .............................. JP2017-187911

(51) Int. Cl.
*H04R 5/00* (2006.01)
*H04S 3/00* (2006.01)
*H04B 1/10* (2006.01)

(52) U.S. Cl.
CPC ........... *H04S 3/008* (2013.01); *H04B 1/1018* (2013.01); *H04S 2400/01* (2013.01)

(58) Field of Classification Search
CPC ...................................................... H04R 5/00
See application file for complete search history.

(56) References Cited

U.S. PATENT DOCUMENTS

2015/0181355 A1 6/2015 Pedersen
2015/0350802 A1* 12/2015 Jo ............................ H04S 5/005
381/1

(Continued)

FOREIGN PATENT DOCUMENTS

JP 2010-230972 A 10/2010
JP 2012-199786 A 10/2012
JP 2015-136100 A 7/2015

OTHER PUBLICATIONS

Takehiro Sugimoto, et al., "22.2ch Audio Encoder/Decoder Using MPEG-4 AAC," NHK Science & Technology Research Laboratories, R&D/No. 155, Jan. 2016, p. 40-46, with its abstract of the Enlgish translation.

(Continued)

*Primary Examiner* — Olisa Anwah
(74) *Attorney, Agent, or Firm* — McDermott Will and Emery LLP

(57) ABSTRACT

An acoustic signal processing device includes: a front signal processor which generates first L and R signals by performing signal processing on a first signal which is a front channel signal; a first adder which generates a fourth signal which is a left channel signal by adding the first L signal and a second signal which is a left channel signal; and a second adder which generates a fifth signal which is a right channel signal by adding the first R signal and a third signal which is a right channel signal. The front signal processor generates the first L and R signals by signal processing in which the first signal is distributed and placed at predetermined positions when the first signal is a dialog signal, and distributed and placed at positions different from the predetermined positions when the first signal is not a dialog signal.

8 Claims, 17 Drawing Sheets

(56) References Cited

U.S. PATENT DOCUMENTS

2017/0011751 A1* 1/2017 Fueg .................. G10L 19/20
2017/0162206 A1* 6/2017 Tsukagoshi .......... G10L 19/167
2021/0037334 A1* 2/2021 Herre .................. H04S 3/02

OTHER PUBLICATIONS

International Search Report and Written Opinion dated Sep. 18, 2018 in International Application No. PCT/JP2018/022385; with partial English translation.

* cited by examiner

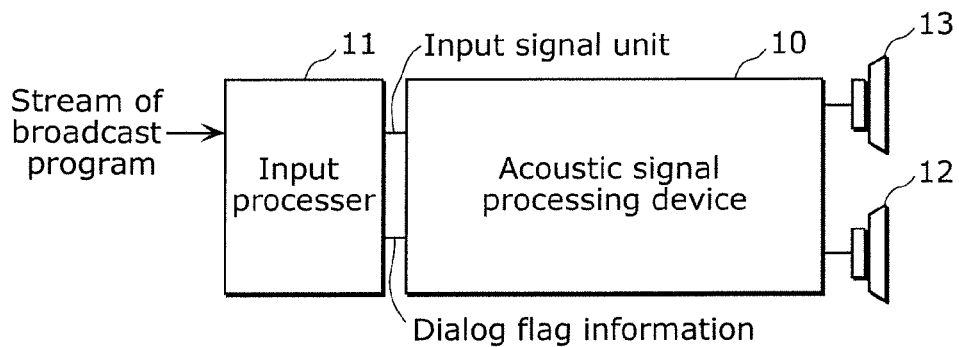
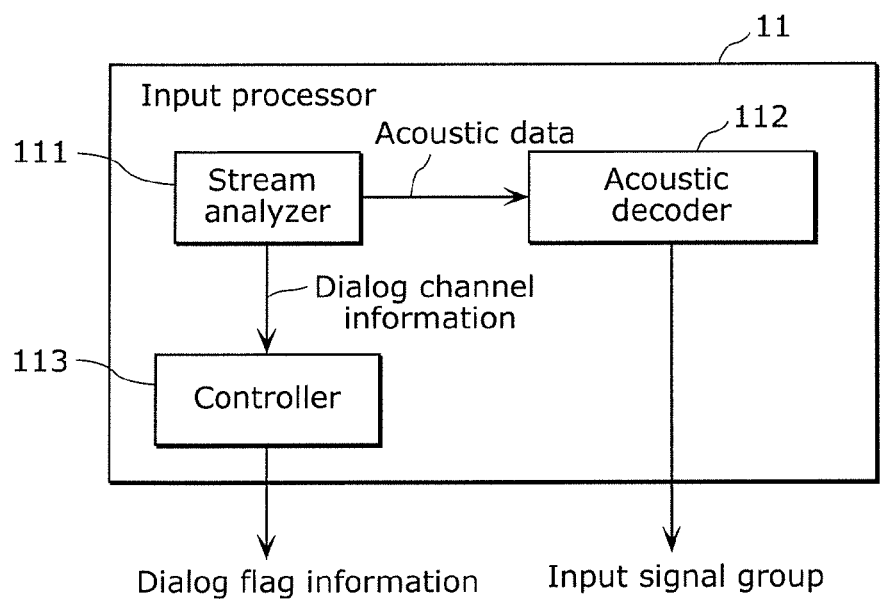
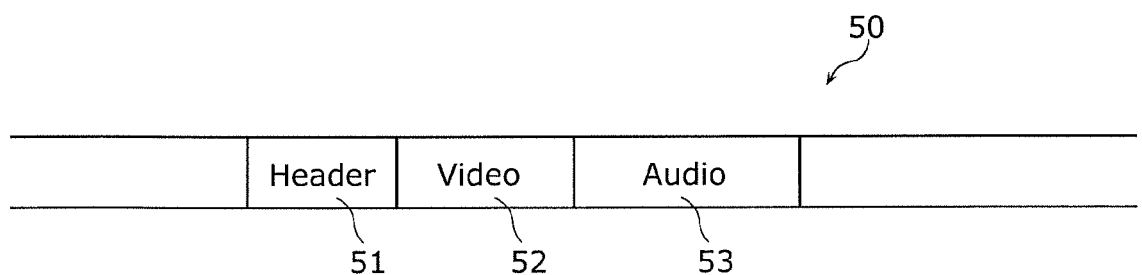

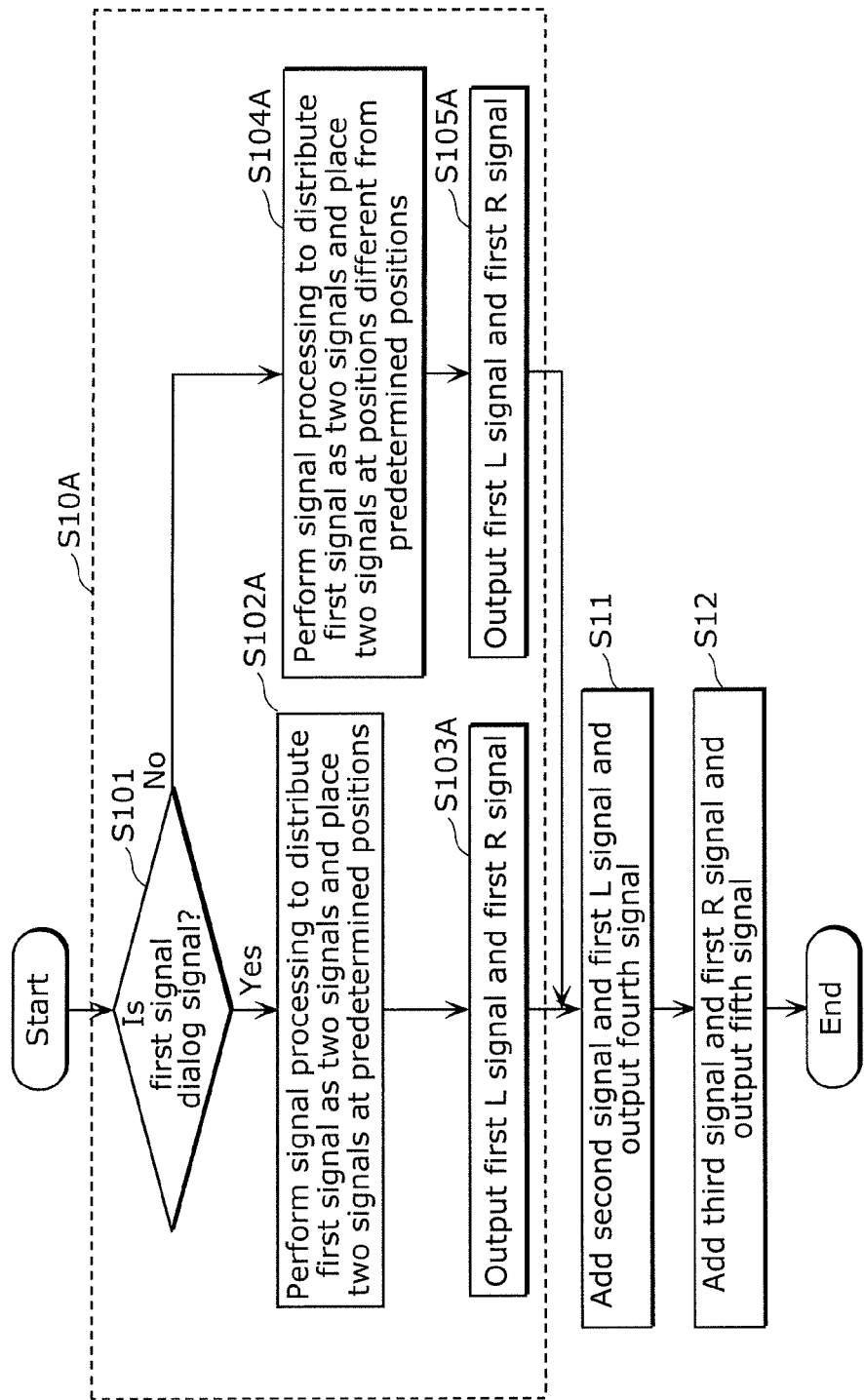

FIG. 18

| Loudspeaker position information | Transfer function HX (Left: LVx, Right: RVx) |
|---|---|
| FLc | LV0, RV0 |
| FL | LV1, RV1 |
| SiL | LV2, RV2 |
| BL | LV3, RV3 |
| TpFL | LV4, RV4 |
| TpSiL | LV5, RV5 |
| TpBL | LV6, RV6 |
| BtFL | LV7, RV7 |
| FRc | RV0, LV0 |
| FRL | RV1, LV1 |
| SiR | RLV2, LV2 |
| BR | RLV3, LV3 |
| TpFR | RV4, LV4 |
| TpSiR | RLV5, LV5 |
| TpBR | RV6, LV6 |
| BtFR | RV7, LV7 |

Upper layer

Middle layer

Lower layer

ACOUSTIC SIGNAL PROCESSING DEVICE AND ACOUSTIC SIGNAL PROCESSING METHOD

CROSS REFERENCE TO RELATED APPLICATIONS

This is a continuation application of PCT International Application No. PCT/JP2018/022385 filed on Jun. 12, 2018, designating the United States of America, which is based on and claims priority of Japanese Patent Application No. 2017-187911 filed on Sep. 28, 2017. The entire disclosures of the above-identified applications, including the specifications, drawings and claims are incorporated herein by reference in their entirety.

FIELD

The present disclosure relates to acoustic signal processing devices and acoustic signal processing methods, and particularly relates to an acoustic signal processing device and an acoustic signal processing method in which signal processing is performed on multi-channel acoustic signals.

BACKGROUND

When watching and listening to video and audio content such as dramas and movies through domestic television receivers or the like, there is a problem in that dialogue such as conversations and lines is hard to hear due to background sounds covering the dialogue, leading to a demand for improvements in the audibility of the dialogue.

In this regard, for the 22.2 ch multi-channel broadcast, there is a technique in which a given channel is set for dialogue only and acoustic signals for the channel can be selectively increased or reduced on the reproduction side (for example, refer to Non Patent Literature (NPL) 1). With the technique disclosed in NPL 1, it is possible to make dialogue easier to hear by increasing the sound volume of the dialogue alone.

CITATION LIST

Non Patent Literature

[NPL 1] Takehiro SUGIMOTO, et al. (2016) "22.2 ch Audio Encoder/Decoder Using MPEG-4 AAC", NHK Science & Technology Research Laboratories, R&D/No. 155, January, p. 40-46

SUMMARY

Technical Problem

However, even if the sound volume of dialogue is increased using the technique proposed in NPL 1, the dialogue is still covered by the background sounds. Therefore, an increase in the sound volume of the dialogue does not always lead to improvements in the audibility of the dialogue. Especially, it is said that an increase in the sound volume causes a listener suffering from an over-recruitment symptom, which is common among elderly people, to feel that the sound is excessively annoying.

Furthermore, the 22.2 ch acoustic system is based on 24 loudspeakers, but, in view of real living environments for viewers, it is necessary to improve the audibility of dialogue using, for example, two loudspeakers, which are less than those required in the 22.2 ch acoustic system.

The present disclosure is conceived in view of the above-described circumstances and has as an object to provide an acoustic signal processing device and an acoustic signal processing method in which the audibility of dialogue can be improved with fewer loudspeakers than channels for input signals.

Solution to Problem

An acoustic signal processing device according to one aspect of the present disclosure is an acoustic signal processing device for performing signal processing on an input signal group of multi-channel acoustic signals to output an output signal group including fewer channel signals than channel signals included in the input signal group. The acoustic signal processing device includes: a flag storage in which a first dialog flag indicating whether a first signal is a dialog signal is stored, the first signal being a front channel signal included in the input signal group; a front signal processor which generates a first L signal and a first R signal by performing signal processing on the first signal; a first adder which generates a fourth signal by adding a second signal and the first L signal, the fourth signal being a left channel signal included in the output signal group, the second signal being a left channel signal included in the input signal group; and a second adder which generates a fifth signal by adding a third signal and the first R signal, the fifth signal being a right channel signal included in the output signal group, the third signal being a right channel signal included in the input signal group. The front signal processor includes: a first sound image localizer which, when the first dialog flag indicates that the first signal is the dialog signal, performs signal processing to distribute the first signal and place distributed first signals at predetermined positions, to generate the first L signal and the first R signal; and a second sound image localizer which, when the first dialog flag indicates that the first signal is not the dialog signal, performs signal processing to distribute the first signal and place distributed first signals at positions different from the predetermined positions, to generate the first L signal and the first R signal.

With this, using fewer loudspeakers than channels for input signals, the sound image of the first signal that is a dialog signal is placed at a position different from the positions of the sound images of the second signal and the third signal which are not dialog signals, and thus dialogue such as lines becomes easier for a listener to hear. In this manner, it is possible to improve the audibility of dialogue with fewer loudspeakers than channels for input signals.

Furthermore, for example, the first sound image localizer may perform signal processing to distribute the first signal and rotate a phase to obtain a phase difference ranging from 90 degrees to 270 degrees, to generate the first L signal and the first R signal, and the second sound image localizer may perform signal processing to distribute the first signal and rotate a phase to obtain a phase difference ranging from −90 degrees to 90 degrees, to generate the first L signal and the first R signal.

With this, the sound image of the first signal that is a dialog signal is perceived as if the sound image was placed inside the brain of a listener (near the listener) with fewer loudspeakers than channels for input signals, and thus the sound becomes easier for the listener to hear. In this manner, it is possible to improve the audibility of dialogue with fewer loudspeakers than channels for input signals.

Furthermore, for example, the front signal processor may further include: a dynamic range compressor which performs signal processing to compress a dynamic range, and when the first dialog flag indicates that the first signal is the dialog signal, the front signal processor may cause the dynamic range compressor to compress a dynamic range of the first signal and output the first signal to the first sound image localizer, and cause the first sound image localizer to perform signal processing to distribute the first signal having the dynamic range compressed and place distributed first signals at predetermined positions, to generate the first L signal and the first R signal.

With this, it is possible to improve the audibility of dialogue in terms of sound image localization and sound volume, and background sounds other than the dialogue can be maintained unchanged from the original sounds. Furthermore, front channel signals can be eliminated, and thus the front loudspeaker is no longer needed. In this manner, it is possible to improve the audibility of dialogue with fewer loudspeakers than channels for input signals.

Furthermore, for example, a second dialog flag indicating whether the second signal is the dialog flag and a third dialog flag indicating whether the third signal is the dialog flag may be further stored in the flag storage, the acoustic signal processing device may further include: a left signal processor which generates a second L signal and a second R signal by performing signal processing on the second signal; and a right signal processor which generates a third L signal and a third R signal by performing signal processing on the third signal, the left signal processor may include: a first left localizer which, when the second dialog flag indicates that the second signal is the dialog signal, performs signal processing to distribute the second signal and place distributed second signals on a left side of a listener, to generate the second L signal and the second R signal; and a second left localizer which, when the second dialog flag indicates that the second signal is not the dialog signal, performs signal processing to place the second signal at a position different from positions at which the first left localizer places the distributed second signals, to generate the second L signal and the second R signal, and the right signal processor may include: a first right localizer which, when the third dialog flag indicates that the third signal is the dialog signal, performs signal processing to distribute the third signal and place distributed third signals on a right side of the listener, to generate the third L signal and the third R signal; and a second right localizer which, when the third dialog flag indicates that the third signal is not the dialog signal, performs signal processing to place the third signal at a position different from positions at which the first right localizer places the distributed third signals, to generate the third L signal and the third R signal, the first adder may generate the fourth signal by adding the first L signal, the second L signal, and the third L signal, and the second adder may generate the fifth signal by adding the first R signal, the second R signal, and the third R signal.

With this, as compared to the sound image of the second signal that is not a dialog signal, the sound image of the second signal that is a dialog signal is perceived as if the sound image was placed near a listener, and thus dialogue such as lines becomes easier for the listener to hear. Similarly, as compared to the sound image of the third signal that is not a dialog signal, the sound image of the third signal that is a dialog signal is perceived as if the sound image was placed near a listener, and thus dialogue such as lines becomes easier for the listener to hear. In this manner, it is possible to improve the audibility of dialogue with fewer loudspeakers than channels for input signals.

Furthermore, for example, the first left localizer may perform signal processing to place a sound image of the second signal on the left side of the listener by applying a crosstalk cancellation process to the distributed second signals, to generate the second L signal and the second R signal, the second left localizer may perform signal processing to place the sound image of the second signal on the left side of the listener without applying the crosstalk cancellation process to the second signal, to generate the second L signal and the second R signal, the first right localizer may perform signal processing to place a sound image of the third signal on the right side of the listener by applying the crosstalk cancellation process to the distributed third signals, to generate the third L signal and the third R signal, and the second right localizer may perform signal processing to place the sound image of the third signal on the right side of the listener without applying the crosstalk cancellation process to the third signal, to generate the third L signal and the third R signal.

With this, the sound image of the second signal that is a dialog signal is perceived as if the sound image was placed at the left ear of a listener, and thus dialogue such as lines becomes easier for the listener to hear. Similarly, the sound image of the third signal that is a dialog signal is perceived as if the sound image was placed at the right ear of a listener, and thus dialogue such as lines becomes easier for the listener to hear. In this manner, it is possible to improve the audibility of dialogue with fewer loudspeakers than channels for input signals.

Furthermore, for example, the acoustic signal processing device may further include: a transfer function group storage table in which a transfer function of sounds reaching both ears of the listener from each of a plurality of loudspeaker positions is stored for each of the plurality of loudspeaker positions; and a position information storage in which loudspeaker position information for specifying loudspeaker positions allocated to the second signal and the third signal is stored. The first left localizer may perform signal processing to place the sound image on the left side of the listener by specifying a first loudspeaker position allocated to the second signal with reference to the position information storage, obtaining a first transfer function between the first loudspeaker position and the both ears of the listener from the first loudspeaker position specified and the transfer function group storage table, applying a process of the first transfer function to the second signal, and applying the crosstalk cancellation process to the second signal. The first right localizer may perform signal processing to place the sound image on the right side of the listener by specifying a second loudspeaker position allocated to the third signal with reference to the position information storage, obtaining a second transfer function between the second loudspeaker position and the both ears of the listener from the second loudspeaker position specified and the transfer function group storage table, applying a process of the second transfer function to the third signal, and applying the crosstalk cancellation process to the third signal.

With this, for example, even in a reproduction environment with only two channel loudspeakers, when at least one of the second signal and the third signal is a dialog signal, the sound of this signal can be heard from the originally intended loudspeaker position for this signal, and thus dialogue such as lines becomes easier for a listener to hear. In this manner, it is possible to improve the audibility of dialogue with fewer loudspeakers than channels for input signals.

Furthermore, an acoustic signal processing device according to one aspect of the present disclosure is an acoustic signal processing device for performing signal processing on an input signal group of multi-channel acoustic signals to output an output signal group including fewer channel signals than channel signals included in the input signal group. The acoustic signal processing device includes: a first flag storage in which a first dialog flag indicating whether a first signal is a dialog signal is stored, the first signal being a front channel signal included in the input signal group; a front signal processor which generates a first L signal and a first R signal by performing signal processing on the first signal; a first adder which generates a fourth signal by adding a second signal and the first L signal, the fourth signal being a left channel signal included in the output signal group, the second signal being a left channel signal included in the input signal group; and a second adder which generates a fifth signal by adding a third signal and the first R signal, the fifth signal being a right channel signal included in the output signal group, the third signal being a right channel signal included in the input signal group. The front signal processor includes: a dynamic range compressor which performs signal processing to compress a dynamic range. When the first dialog flag indicates that the first signal is the dialog signal, the front signal processor distributes a signal obtained by the dynamic range compressor compressing a dynamic range of the first signal, to generate the first L signal and the first R signal. When the first dialog flag indicates that the first signal is not the dialog signal, the front signal processor distributes the first signal to generate the first L signal and the first R signal.

With this, a dynamic range compression process substantially the same as a hearing aid process is performed on the first signal that is a dialog signal, and thus dialogue such as lines becomes easier for a listener to hear. In this manner, it is possible to improve the audibility of dialogue with fewer loudspeakers than channels for input signals.

Furthermore, an acoustic signal processing method according to one aspect of the present disclosure is an acoustic signal processing method for performing signal processing on an input signal group of multi-channel acoustic signals to output an output signal group including fewer channel signals than channel signals included in the input signal group. The acoustic signal processing method includes: generating a first L signal and a first R signal by performing signal processing on a first signal which is a front channel signal included in the input signal group; generating a fourth signal by adding a second signal and the first L signal, the fourth signal being a left channel signal included in the output signal group, the second signal being a left channel signal included in the input signal group; and generating a fifth signal by adding a third signal and the first R signal, the fifth signal being a right channel signal included in the output signal group, the third signal being a right channel signal included in the input signal group. The generating of a first L signal and a first R signal includes: performing, when a first dialog flag indicating whether the first signal is a dialog signal indicates that the first signal is the dialog signal, signal processing to distribute the first signal and place distributed first signals at predetermined positions, to generate the first L signal and the first R signal; and performing, when the first dialog flag indicates that the first signal is not the dialog signal, signal processing to distribute the first signal and place distributed first signals at positions different from the predetermined positions, to generate the first L signal and the first R signal.

With this, it is possible to improve the audibility of dialogue with fewer loudspeakers than channels for input signals.

Note that the aforementioned general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Advantageous Effects

With the acoustic signal processing device, etc., according to the present disclosure, it is possible to improve the audibility of dialogue with fewer loudspeakers than channels for input signals.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram illustrating an example of the configuration of a system according to Embodiment 1.

FIG. 2 is a block diagram illustrating an example of the configuration of an input processor according to Embodiment 1.

FIG. 3 is a diagram illustrating an example of the structure of a stream of a broadcast program.

FIG. 9 is a flowchart illustrating the operation of an acoustic signal processing device according to Embodiment 2.

FIG. 18 is a diagram illustrating an example of a transfer function group storage table in the 22.2 ch standard.

DESCRIPTION OF EMBODIMENTS

Underlaying Knowledge Forming the Basis of the Present Disclosure

In the ARIB standard STD-B32, the 22.2 ch (22.2 channel ch) audio encoding format is specified. This 22.2 ch audio encoding format is designed to be used in practice as an audio format in the 8K super Hi-Vision broadcast.

Figure 23A:
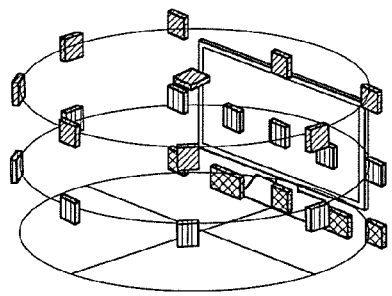
FIG. 23A is a diagram illustrating the positions of loudspeakers in the 22.2 ch standard.
Figure 23B:
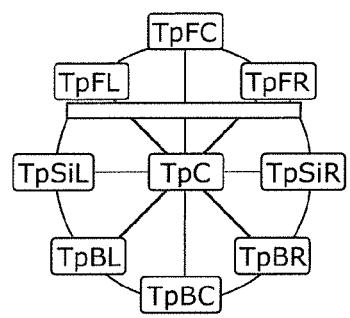
FIG. 23B is a diagram illustrating the positions of loudspeakers and respective channel labels thereof in the 22.2 ch standard.
Figure 23C:
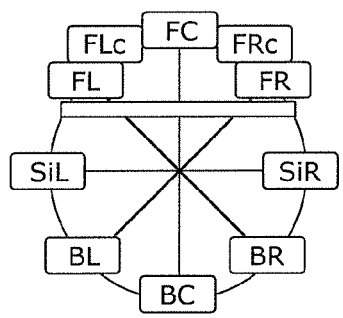
FIG. 23C is a diagram illustrating the positions of loudspeakers and respective channel labels thereof in the 22.2 ch standard.
Figure 23D:
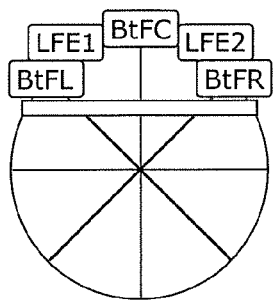
FIG. 23D is a diagram illustrating the positions of loudspeakers and respective channel labels thereof in the 22.2 ch standard.

In the 22.2 ch standard, the arrangement of loudspeakers (loudspeaker positions) and the name (channel label) of the position of each of the loudspeaker are defined. FIG. 23A is a diagram illustrating the positions of loudspeakers in the 22.2 ch standard. FIG. 23B to FIG. 23D are diagrams illustrating the positions of loudspeakers and the respective channel labels thereof in the 22.2 ch standard. FIG. 23B illustrates the arrangement of loudspeakers and the channel labels in an upper layer that is at a ceiling level, FIG. 23C illustrates the arrangement of loudspeakers and the channel labels in a middle layer that is at the level of a viewpoint of a viewer, and FIG. 23D illustrates the arrangement of loudspeakers and the channel labels in a lower layer that is at a floor level. Specifically, in the 22.2 ch standard, nine normal loudspeakers are arranged in the upper layer, ten normal loudspeakers are arranged in the middle layer, and three normal loudspeakers are arranged in the lower layer; a total of 22 normal loudspeakers are arranged, and two subwoofers (loudspeakers for low-frequency sounds) are arranged in the lower layer.

Furthermore, the 22.2 ch standard allows a broadcaster to designate, for each broadcast program, a "dialog channel" from among channels in the 22.2 ch configuration. Specifically, the broadcaster can set the number and positions of dialog channels for each broadcast program.

Figure 24:
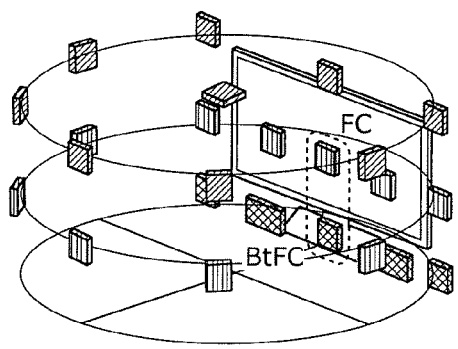
FIG. 24 is a diagram illustrating an example of a dialog channel in NPL 1.

FIG. 24 is a diagram illustrating an example of a dialog channel in NPL 1. FIG. 24 illustrates an example of a dialog channel which is a channel set for dialogue only in NPL 1, showing an example where a front channel (FC) in the middle layer and a front channel (BtFC) in the lower layer are set as dialog channels.

In the dialog channel, only dialog components are transferred. A receiving terminal can specify a dialog channel because a flag indicating which channel in the 22.2 ch channel configuration is designated as the dialog channel is transferred for each broadcast program.

A receiving terminal can control the sound volume of the dialog channel designated by the flag transferred thereto, independently of another channel.

Figure 25:
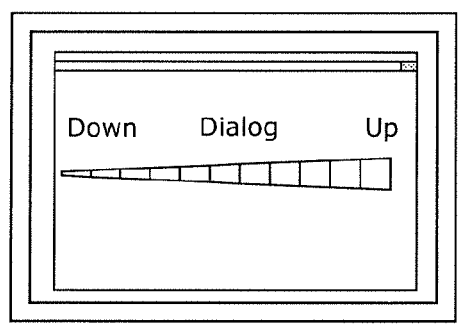
FIG. 25 is a diagram illustrating an example of a user interface for dialog sound volumes in NPL 1.

FIG. 25 is a diagram illustrating an example of a user interface for dialog sound volumes in NPL 1. The sound volume of only the dialogue in the dialog channel designated by the transferred flag can be increased or reduced by the user interface illustrated in FIG. 25.

With this, the sound volume of dialogue can be increased or reduced independently of background sounds, and thus a viewer can set the sound volume of dialogue to a comfortable level according to his or her own preferences or hearing ability. Furthermore, for example, in the case where dialogue is hard to hear, a viewer can make the dialogue easier to hear by increasing the volume of the dialogue while the overall volume is reduced.

In this manner, with the technique disclosed in NPL 1, it is possible to make dialogue easier to hear by increasing the sound volume of the dialogue alone.

However, even in the case where the sound volume of dialogue is increased using the technique proposed in NPL 1, the dialogue is still covered by the background sounds. Therefore, an increase in the sound volume of the dialogue does not always lead to improvements in the audibility of the dialogue. Especially, for a viewer suffering from symptoms of the recruitment phenomenon, an increase in volume does not always lead to improvements in the audibility of dialogue. Here, the symptoms of the recruitment phenomenon include a reduced ability to hear small sounds while loud sounds overstimulate auditory perception and are perceived as annoying at an uncomfortable level.

The 22.2 ch acoustic system is based on 24 loudspeakers. Meanwhile, in real living environments for viewers, an acoustic system including two loudspeakers is used, for example. In view of these circumstances, it is recommended to improve the audibility of dialogue using loudspeakers with fewer channels than channels for 22.2 ch input signals.

Hereinafter, embodiments of the present disclosure will be described in detail with reference to the drawings. Note that each of the embodiments described below shows a specific example of the present disclosure. The numerical values, shapes, materials, structural elements, and the arrangement and connection of the structural elements, usage procedures, communication procedures, etc., shown in the following embodiments are mere examples, and are not intended to limit the present disclosure. Among the structural elements in the following embodiments, structural elements not recited in any one of the independent claims which indicate the broadest concepts of the present disclosure will be described as arbitrary structural elements. Note that the figures are schematic diagrams and are not necessarily precise illustrations. In the figures, substantially identical elements are assigned the same reference signs, and overlapping description will be omitted or simplified.

Embodiment 1

Hereinafter, with reference to the drawings, the acoustic signal processing device, etc., according to Embodiment 1 will be described.

[Configuration of System]

FIG. 1 is a block diagram illustrating an example of the configuration of a system according to Embodiment 1.

The system illustrated in FIG. 1 includes an acoustic signal processing device 10, an input processor 11, a left loudspeaker 12, and a right loudspeaker 13. The system illustrated in FIG. 1 is, for example, mounted on a television (TV) device or the like.

The acoustic signal processing device 10 performs signal processing on input multi-channel acoustic signals and outputs the resultant signals. The multi-channel includes, for example, 22.2-channels, but may include 5.1-channels; it is sufficient that the multi-channel include at least 3-channels.

The input processor 11 receives, for example, a stream of a multi-channel broadcast program and obtains dialog flag information and an input signal group of multi-channel acoustic signals, and transmits the dialog flag information and the input signal group to the acoustic signal processing device 10.

The left loudspeaker 12 is one of the two loudspeakers that is located on the left side when viewed from a viewer or a listener. In the case where the system illustrated in FIG. 1 is mounted on a TV device, the left loudspeaker 12 is disposed on the right side of the TV device when the listener is viewed from the TV device.

The right loudspeaker 13 is one of the two loudspeakers that is located on the right side when viewed from a viewer or a listener. In the case where the system illustrated in FIG. 1 is mounted on a TV device, the right loudspeaker 13 is disposed on the left side of the TV device when the listener is viewed from the TV device.

[Configuration of Input Processor 11]

FIG. 2 is a block diagram illustrating an example of the configuration of the input processor 11 according to Embodiment 1.

The input processor 11 illustrated in FIG. 2 includes a stream analyzer 111, an acoustic decoder 112, and a controller 113.

<Stream Analyzer 111>

The stream analyzer 111 analyzes the stream of the multi-channel broadcast program input to the input processor 11, transmits acoustic data included in the stream to the acoustic decoder 112, and transmits dialog channel information included in the stream to the controller 113.

FIG. 3 is a diagram illustrating an example of the structure of the stream of the broadcast program.

For example, as illustrated in FIG. 3, a stream 50 of a multi-channel broadcast program includes at least a header 51, video 52 including video data, and audio 53 including acoustic data. For example, the audio 53 includes acoustic data of each of multi-channels. For example, when the multi-channel is 22.2-channel, the audio 53 includes acoustic data of each of 24 loudspeakers. Furthermore, the header 51 includes dialog channel information indicating the number of channels in the multi-channels and which channel in the multi-channels includes dialogue.

The stream analyzer 111 analyzes the stream 50 of the multi-channel broadcast program such as that illustrated in FIG. 3, transmits the acoustic data in the audio 53 or the like to the acoustic decoder 112, and transmits the dialog channel information to the controller 113.

<Acoustic Decoder 112>

The acoustic decoder 112 transmits, to the acoustic signal processing device 10, multi-channel acoustic signals obtained by decoding the acoustic data transmitted from the stream analyzer 111. In the example illustrated in FIG. 3, the acoustic decoder 112 transmits, to the acoustic signal processing device 10, multi-channel acoustic signals obtained by decoding the audio 53 transmitted from the stream analyzer 111.

<Controller 113>

The controller 113 generates a dialog flag from the dialog channel information transmitted from the stream analyzer 111 and transmits the dialog flag to the acoustic signal processing device 10. For example, when a first channel signal is dialogue, the first dialog flag is set to 1, and when the first channel signal is not dialogue, the first dialog flag is set to 0. This process is performed on each channel.

[Configuration of Acoustic Signal Processing Device 10]

Hereinafter, the acoustic signal processing device 10 will be described in detail.

[Computer 1000]

First, the hardware configuration of the acoustic signal processing device 10 will be described with reference to FIG. 4.

Figure 4:
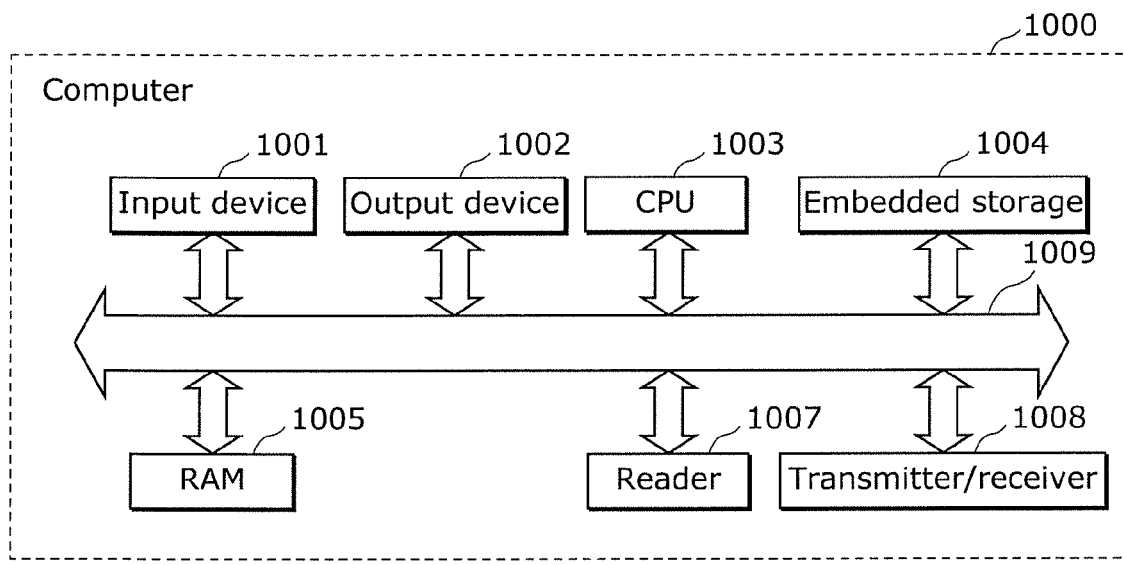
FIG. 4 is a diagram illustrating an example of the hardware configuration of a computer that implements, using software, the functions of an acoustic signal processing device according to Embodiment 1.

FIG. 4 is a diagram illustrating an example of the hardware configuration of a computer 1000 that implements, using software, the functions of the acoustic signal processing device 10 according to Embodiment 1.

As illustrated in FIG. 4, the computer 1000 includes an input device 1001, an output device 1002, a central processing unit (CPU) 1003, an embedded storage 1004, a random access memory (RAM) 1005, a reader 1007, a transmitter/receiver 1008, and a bus 1009. The input device 1001, the output device 1002, the CPU 1003, the embedded storage 1004, the RAM 1005, the reader 1007, and the transmitter/receiver 1008 are connected by the bus 1009.

The input device 1001 serves as a user interface including an input button, a touch pad, a touch panel display, and the like, and receives a user operation. Note that the input device 1001 may be configured to not only receive a user touch operation, but also receive a voice operation and a remote operation using a remote controller.

The embedded storage 1004 is a flash memory or the like. Furthermore, in the embedded storage 1004, a program for implementing the functions of the acoustic signal processing device 10 and/or an application that uses the functions and configuration of the acoustic signal processing device 10 may be stored in advance.

The RAM 1005, which is a random access memory, is used to store data and the like upon execution of the program, the application, or the like.

The reader 1007 reads information from a recording medium such as a universal series bus (USB) memory or the like. The reader 1007 reads the aforementioned program, application, or the like from a recording medium on which the program, the application, or the like is recorded and causes the embedded storage 1004 to store the program, the application, or the like.

The transmitter/receiver 1008 is a communication circuit that performs wired or wireless communication. For example, the transmitter/receiver 1008 performs communication with a server device connected to a network, downloads the aforementioned program, application, or the like from the server device, and causes the embedded storage 1004 to store the program, the application, or the like.

The CPU 1003, which is a central processing unit, copies, onto the RAM 1005, the program, the application, or the like stored in the embedded storage 1004, sequentially reads, from the RAM 1005, commands included in the program, the application, or the like, and executes the commands.

[Acoustic Signal Processing Device 10]

Next, each of the functional elements of the acoustic signal processing device 10 will be described with reference to FIG. 5 and FIG. 6.

Figure 5:
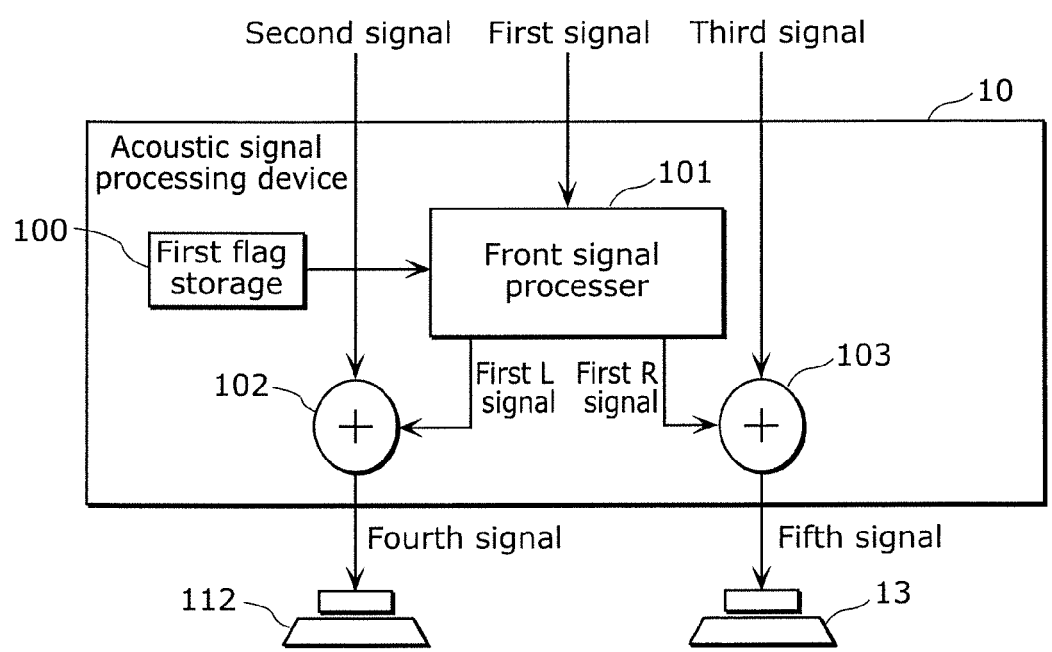
FIG. 5 is a block diagram illustrating an example of the configuration of an acoustic signal processing device according to Embodiment 1.

FIG. 5 is a block diagram illustrating an example of the configuration of the acoustic signal processing device 10 according to Embodiment 1.

The acoustic signal processing device 10 performs signal processing on the input signal group of multi-channel acoustic signals to output an output signal group including fewer channel signals than channel signals included in the input signal group. In the present embodiment, the acoustic signal processing device 10 includes a first flag storage 100, a front signal processor 101, a first adder 102, and a second adder 103, as illustrated in FIG. 5.

Hereinafter, in order to simplify description, it is assumed that the input signal group includes a first signal, a second signal, and a third signal, and the output signal group includes a fourth signal and a fifth signal.

<Input Signal Group>

Assume that the first signal is a signal (front channel signal) included in the input signal group and allocated to a front channel. The first signal is, for example, allocated to FC in the 22.2 ch standard, but this is not limiting. It is sufficient that the first signal be allocated to a loudspeaker position that is not biased to the left or the right; the first signal may be allocated to BtFC, TcFC, BC, TpC, or TpBC in the 22.2 ch standard.

Assume that the second signal is a signal (left channel signal) included in the input signal group and allocated to a left channel. The second signal is, for example, allocated to FLc in the 22.2 ch standard, but this is not limiting. It is sufficient that the second signal be allocated to a loudspeaker position biased to the left; the second signal may be allocated to BtFL, FL, SiL, BL, TpFL, TpSiL, or TpBL in the 22.2 ch standard.

Assume that the third signal is a signal (right channel signal) included in the input signal group and allocated to a right channel. The third signal is, for example, allocated to FRc in the 22.2 ch standard, but this is not limiting. It is sufficient that the third signal be allocated to a loudspeaker position biased to the right; the third signal may be allocated to BtFR, FR, SiR, BR, TpFR, TpSiR, or TpBR in the 22.2 ch standard.

<Output Signal Group>

The fourth signal is a left channel signal that is included in the output signal group and is output from a loudspeaker disposed on the left side. The fifth signal is a right channel signal that is included in the output signal group and is output from a loudspeaker disposed on the right side.

<First Flag Storage 100>

In the first flag storage 100, a first dialog flag indicating whether the first signal, which is the front channel signal included in the input signal group, is a dialog signal is stored. The first flag storage 100 is, for example, a memory such as a flash memory or a hard disk drive (HDD). In the first flag storage 100, for example, the dialog flag information transmitted from the input processor 11 is stored, and thus the first dialog flag is stored.

<Front Signal Processor 101>

Figure 6:
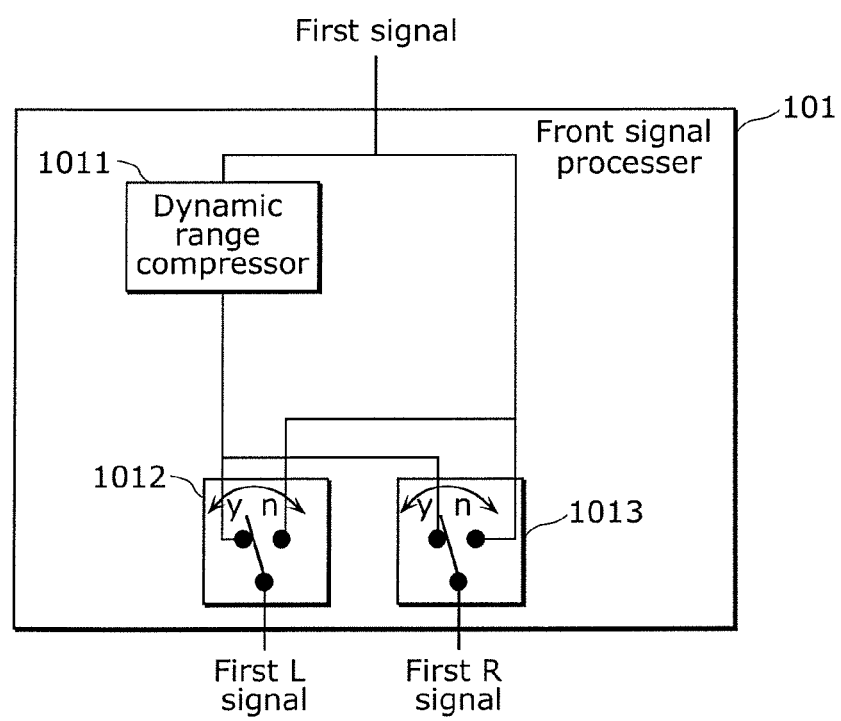
FIG. 6 is a diagram illustrating an example of the detailed configuration of a front signal processor according to Embodiment 1.

FIG. 6 is a diagram illustrating an example of the detailed configuration of the front signal processor 101 according to Embodiment 1.

The front signal processor 101 obtains the first dialog flag from the first flag storage 100 and generates a first L signal and a first R signal by performing signal processing on the first signal. The front signal processor 101 transmits the generated first L signal to the first adder 102 and outputs the generated first R signal to the second adder 103.

In the present embodiment, the front signal processor 101 includes a dynamic range compressor 1011, a selector 1012, and a selector 1013, as illustrated in FIG. 6.

<<Dynamic Range Compressor 1011>>

The dynamic range compressor 1011 performs signal processing to compress a dynamic range. More specifically, the dynamic range compressor 1011 performs signal processing to amplify the first signal when the amplitude of the first signal is small, and attenuate the first signal when the amplitude of the first signal is large, thus compressing the dynamic range of the first signal.

<<Selector 1012>>

The selector 1012 performs signal switching according to the first dialog flag indicating whether the first signal is a dialog signal, and outputs the first L signal to the first adder 102.

For example, when the first dialog flag indicates that the first signal is a dialog signal, the selector 1012 outputs one of first signals obtained by compressing the dynamic range of the first signal and distributing the first signal to the first adder 102 as the first L signal. On the other hand, when the first dialog flag indicates that the first signal is not a dialog signal, the selector 1012 outputs one of distributed first signals to the first adder 102 as the first L signal.

<<Selector 1013>>

The selector 1013 performs signal switching according to the first dialog flag indicating whether the first signal is a dialog signal, and outputs the first R signal to the second adder 103.

For example, when the first dialog flag indicates that the first signal is a dialog signal, the selector 1013 outputs the other of the first signals obtained by compressing the dynamic range of the first signal and distributing the first signal to the second adder 103 as the first R signal. On the other hand, when the first dialog flag indicates that the first signal is not a dialog signal, the selector 1013 outputs the other of the distributed first signals to the second adder 103 as the first R signal.

In this manner, when the first dialog flag indicates that the first signal is a dialog signal, the front signal processor 101 generates the first L signal and the first R signal by distributing the signal obtained by the dynamic range compressor 1011 compressing the dynamic range of the first signal. Furthermore, when the first dialog flag indicates that the first signal is not a dialog signal, the front signal processor 101 generates the first L signal and the first R signal by distributing the first signal.

<First Adder 102>

The first adder 102 defines, as the fourth signal which is the left channel signal included in the output signal group, a signal obtained by adding the second signal and the first L signal. More specifically, the first adder 102 generates the fourth signal by adding the second signal input by the input processor 11 and the first L signal input by the front signal processor 101, and outputs the fourth signal to the left loudspeaker 12.

<Second Adder 103>

The second adder 103 defines, as the fifth signal which is the right channel signal included in the output signal group, a signal obtained by adding the third signal and the first R signal. More specifically, the second adder 103 generates the fifth signal by adding the third signal input by the input processor 11 and the first R signal input by the front signal processor 101, and outputs the fifth signal to the right loudspeaker 13.

[Operation of Acoustic Signal Processing Device 10]

The operation of the acoustic signal processing device 10 configured as described above will be described.

Figure 7:
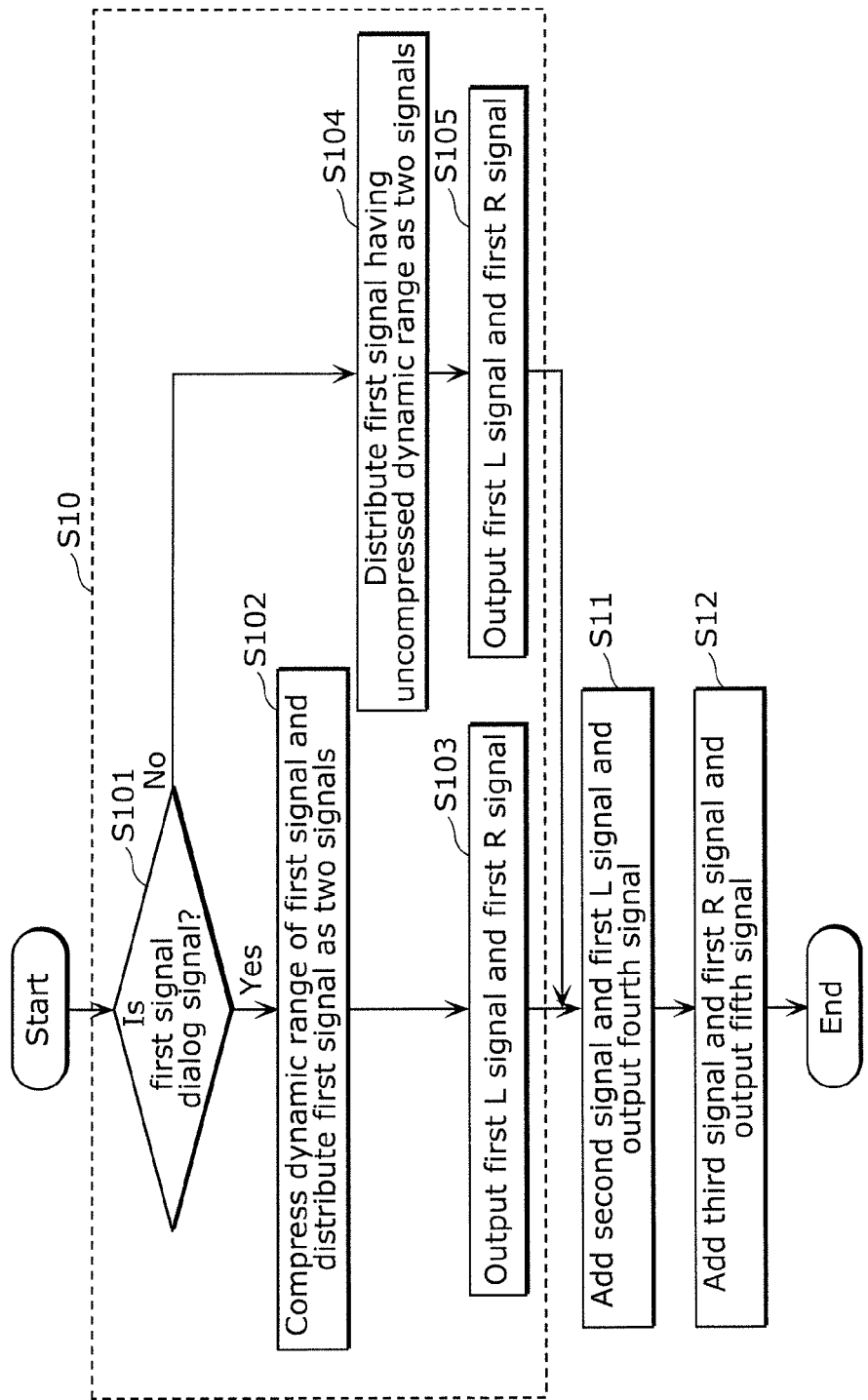
FIG. 7 is a flowchart illustrating the operation of an acoustic signal processing device according to Embodiment 1.

FIG. 7 is a flowchart illustrating the operation of the acoustic signal processing device 10 according to Embodiment 1.

First, the acoustic signal processing device 10 obtains the first dialog flag and performs front signal processing to generate the first L signal and the first R signal by performing signal processing on the first signal input by the input processor 11 (S10).

More specifically, the acoustic signal processing device 10 checks the first dialog flag and determines whether the first signal is a dialog signal (S101). When the first signal is a dialog signal in S101 (Yes in S101), the acoustic signal processing device 10 compresses the dynamic range of the first signal and distributes the first signal as two signals (S102). Furthermore, the two distributed signals are output as the first L signal and the first R signal (S103). On the other hand, when the first signal is not a dialog signal in S101 (No in S101), the acoustic signal processing device 10 distributes the first signal as two signals (S104). Furthermore, the two distributed signals are output to the first L signal and the first R signal (S105).

Next, the acoustic signal processing device 10 performs a first addition process to add the second signal and the first L signal output in S10 and output the added signals as the fourth signal to the left loudspeaker 12 (S11).

Next, the acoustic signal processing device 10 performs a second addition process to add the third signal and the first R signal output in S10 and output the added signals as the fifth signal to the right loudspeaker 13 (S12).

[Advantageous Effects, etc.]

With the acoustic signal processing device 10 according to the present embodiment, when the first signal is a dialog signal, sounds based on the first signal having the dynamic range compressed are output from the left loudspeaker 12 and the right loudspeaker 13. Specifically, when the first signal is a dialog signal, since the first signal of the sounds output from the left loudspeaker 12 and the right loudspeaker 13 represents dialogue the meaning of which needs to be understood, the dynamic range of the first signal is compressed before the sounds are output. It is known that when the dynamic range is compressed, dialogue such as lines becomes easier to hear even at low sound volume. Especially, for a listener suffering from symptoms of the recruitment phenomenon, the compression is known to significantly improve the audibility of the dialogue. This is because the process of compressing the dynamic range matches improvements in symptoms of the recruitment phenomenon such as a reduced ability to hear small sounds while loud sounds are perceived as excessively annoying. Thus, it is possible to improve the audibility of the output dialogue by compressing the dynamic range.

On the other hand, with the acoustic signal processing device 10 according to the present embodiment, when the first signal is not a dialog signal, sounds based on the first signal having the dynamic range uncompressed are output from the left loudspeaker 12 and the right loudspeaker 13. When the first signal is not a dialog signal, the first signal of the sounds output from the left loudspeaker 12 and the right loudspeaker 13 represents background sounds, music, or the like. Therefore, there is no need to compress the dynamic range before the sounds are output.

In this manner, the audibility of dialogue can be favorably improved in terms of the sound volume while background sounds other than the dialogue can be maintained unchanged from the original sounds. Furthermore, since front channel signals can be eliminated, the front loudspeaker is no longer needed.

As described above, with the acoustic signal processing device 10 according to the present embodiment, it is possible to improve the audibility of dialogue with fewer loudspeakers than channels for input signals.

Embodiment 2

Although Embodiment 1 describes the sound volume improvements in the audibility of dialogue, this is not limiting. Embodiment 2 describes sound image localization improvements in the audibility of dialogue.

The system and the configuration of the input processor 11 according to Embodiment 2 are substantially the same as those described in Embodiment 1. Furthermore, the configuration of the acoustic signal processing device 10 according to Embodiment 2 is substantially the same as that of the acoustic signal processing device 10 illustrated in FIG. 5 except for the detailed configuration of a front signal processor 101A. The following description focuses on differences from Embodiment 1.

[Configuration of Front Signal Processor 101A]

Figure 8:
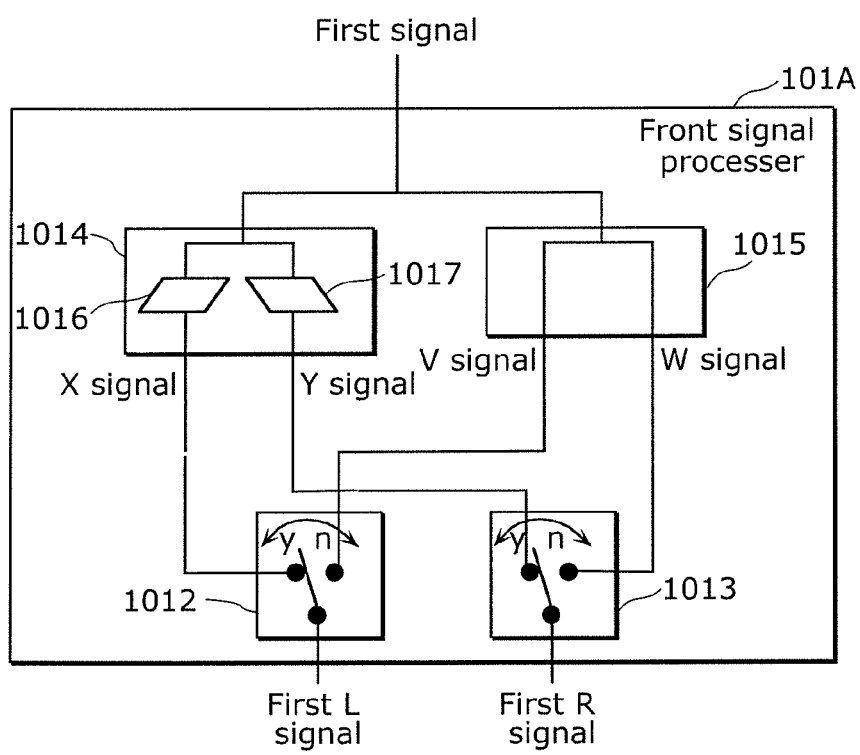
FIG. 8 is a diagram illustrating an example of the detailed configuration of a front signal processor according to Embodiment 2.

FIG. 8 is a diagram illustrating an example of the detailed configuration of the front signal processor 101A according to Embodiment 2. Note that elements substantially the same as those in FIG. 5 are assigned the same reference numerals and detailed description thereof will be omitted.

As in Embodiment 1, the front signal processor 101A obtains the first dialog flag from the first flag storage 100 and generates the first L signal and the first R signal by performing signal processing on the first signal. The front signal processor 101A transmits the generated first L signal to the first adder 102 and outputs the generated first R signal to the second adder 103.

In the present embodiment, the front signal processor 101A includes a first sound image localizer 1014, a second sound image localizer 1015, the selector 1012, and the selector 1013, as illustrated in FIG. 8.

<First Sound Image Localizer 1014>

The first sound image localizer 1014 performs signal processing to distribute the first signal and place the resultant signals at predetermined positions, thereby generating the first L signal and the first R signal. More specifically, the first sound image localizer 1014 performs signal processing to distribute the first signal and rotate the phase so that the phase difference ranges from 90 degrees to 270 degrees, thereby generating the first L signal and the first R signal.

As illustrated in FIG. 8, the first sound image localizer 1014 includes a first phase rotator 1016 and a second phase rotator 1017, and distributes the first signal as two signals, rotates the phases of two distributed first signals, and thus generates an X signal and a Y signal which are two signals having a phase difference of 180 degrees. For example, the first phase rotator 1016 performs signal processing to rotate the phase of one of the two distributed first signals by +90 degrees, thereby generating the X signal. The second phase rotator 1017 performs signal processing to rotate the phase of the other of the two distributed first signals by −90 degrees, thereby generating the Y signal. Thus, the X signal and the Y signal have a phase difference of 180 degrees.

When the first signal is a dialog signal, the X signal generated by the first phase rotator 1016 is output to the first adder 102 as the first L signal using the selector 1012. When the first signal is a dialog signal, the Y signal generated by the second first phase rotator 1017 is output to the second adder 103 as the first R signal using the selector 1013.

Here, the reason why the X signal and the Y signal which are two signals having a phase difference of 180 degrees are generated is as follows. Specifically, it has been long known that when the sounds based on two signals having a phase difference of 180 degrees are output from loudspeakers located on the left and right sides when viewed from a listener, the sounds based on these two signals are perceived as if the sound images of these two signals were placed inside the brain of the listener (placed near the listener); this phenomenon is intended to be used.

Note that the first phase rotator 1016 may perform signal processing to invert the phase of one of the two distributed first signals (180-degree rotation) to generate the X signal and the second phase rotator 1017 may generate the Y signal by using the other of the two distributed first signals itself (0-degree rotation). It goes without saying that the X signal and the Y signal may be opposite in the phase rotation relationship.

Furthermore, the phase difference between the X signal and the Y signal is not required to be 180 degrees. According to experiments conducted by the inventors of the present disclosure, as long as the phase difference between the X signal and the Y signal is approximately between 90 degrees and 270 degrees, inclusive, the sound images based on these signals are perceived as being close to a listener. Therefore, it is sufficient that the first sound image localizer 1014 perform signal processing to distribute the first signal and rotate the phase so that the phase difference ranges from 90 degrees to 270 degrees, thereby generating the first L signal and the first R signal.

<Second Sound Image Localizer 1015>

The second sound image localizer 1015 performs signal processing to distribute the first signal and place the resultant signals at positions different from the predetermined positions, thereby generating the first L signal and the first R signal. More specifically, the second sound image localizer 1015 performs signal processing to distribute the first signal and rotate the phase so that the phase difference ranges from −90 degrees to 90 degrees, thereby generating the first L signal and the first R signal.

As illustrated in FIG. 8, the second sound image localizer 1015 distributes the first signal as two signals and generates a V signal by using one of the two distributed first signals and a W signal by using the other of the two distributed first signals. In this manner, the second sound image localizer 1015 distributes the first signal as two signals having a phase difference of zero degrees and uses the two signals as the V signal and the W signal, as illustrated in FIG. 8.

When the first signal is not a dialog signal, the V signal generated by the second sound image localizer 1015 is output to the first adder 102 as the first L signal using the selector 1012. When the first signal is not a dialog signal, the W signal generated by the second sound image localizer 1015 is output to the second adder 103 as the first R signal using the selector 1013.

Here, the reason why the V signal and the W signal which are two signals having a phase difference of zero degrees are generated is as follows. Specifically, it has been long known that when the sounds based on two signals having a phase difference of zero degrees are output from loudspeakers located on the left and right sides when viewed from a listener, the sounds based on these two signals are perceived as if the sound images of these two signals were placed in the middle between these loudspeakers; this phenomenon is intended to be used.

Note that although the foregoing describes the second sound image localizer 1015 as using the first signal to generate two signals having a phase difference of zero degrees, the phase difference is not necessarily limited to zero degrees; it is sufficient that the phase difference be close to zero degrees (a value of greater than −90 degrees, but less than +90 degrees).

[Operation of Acoustic Signal Processing Device 10]

The operation of the acoustic signal processing device 10 according to Embodiment 2 configured as described above will be described.

FIG. 9 is a flowchart illustrating the operation of the acoustic signal processing device 10 according to Embodiment 2. Note that elements substantially the same as those in FIG. 7 are assigned the same reference numerals and detailed description thereof will be omitted.

First, the acoustic signal processing device 10 according to Embodiment 2 obtains the first dialog flag and performs front signal processing to generate the first L signal and the first R signal by performing signal processing on the first signal input by the input processor 11 (S10A).

More specifically, the acoustic signal processing device 10 according to Embodiment 2 checks the first dialog flag and determines whether the first signal is a dialog signal (S101). When the first signal is a dialog signal in S101 (Yes in S101), the acoustic signal processing device 10 according to Embodiment 2 performs signal processing to distribute the first signal as two signals and place the two signals at predetermined positions (S102A).

Furthermore, the X signal and the Y signal which are the two signals resulting from the signal processing performed in S102A are output as the first L signal and the first R signal (S103A). On the other hand, when the first signal is not a dialog signal in S101 (No in S101), the acoustic signal processing device 10 according to Embodiment 2 performs signal processing to distribute the first signal as two signals and place the two signals at positions different from the predetermined positions (S104A). Furthermore, the V signal and the W signal which are the two signals resulting from the signal processing performed in S104A are output as the first L signal and the first R signal (S105A).

The subsequent steps S11 and S12 are as described in Embodiment 1, and thus description thereof shall not be repeated.

[Advantageous Effects, etc.]

With the acoustic signal processing device 10 according to the present embodiment, when the first signal is a dialog signal, the signal processing to distribute the first signal as two signals and place the two signals at the predetermined positions is performed, and then the two signals are output as the first L signal and the first R signal. The first L signal is added to the second signal and output from the left loudspeaker 12, and the first R signal is added to the third signal and output from the right loudspeaker 13. As a result, the sound image of the first signal that is a dialog signal is placed at a position different from the positions of the second signal and the third signal that are not dialog signals, and thus it is possible to make dialogue such as lines easier for listeners to hear. Here, in the case where the first signal is a dialog signal, when the signal processing to distribute the first signal and rotate the phase so that the phase difference becomes 180 degrees is performed, the sounds based on the first signals are perceived as if the sound images of the first signals were placed inside the brain of a listener (placed near the listener); thus, it is possible to make dialogue easier for the listener to hear.

On the other hand, with the acoustic signal processing device 10 according to the present embodiment, when the first signal is not a dialog signal, the signal processing to distribute the first signal as two signals and place the two signals at positions different from the predetermined positions is performed, and then the two signals are output as the first L signal and the first R signal. The signal processing to place the two signals at positions different from the predetermined positions corresponds to rotating the phase so that the phase difference between the two distributed first signals is close to zero degrees, for example, a value of greater than −90 degrees, but less than +90 degrees. The sound image of the first signal that is not a dialog signal does not need to be placed at a position different from the positions of the sound images of the second signal and the third signal that are not dialog signals, and thus is placed near the sound images of the second signal and the third signal, and the sound based on the first signal is perceived as if the sound image of the first signal was placed in the middle between the loudspeakers.

Figure 10A:
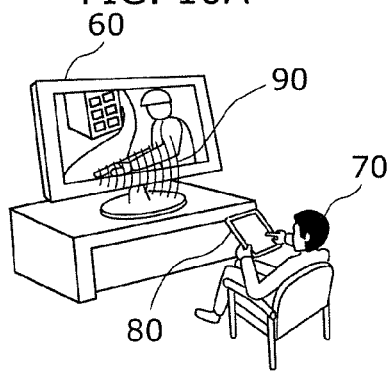
FIG. 10A is a diagram for describing the advantageous effects obtained in Embodiment 2.
Figure 10B:
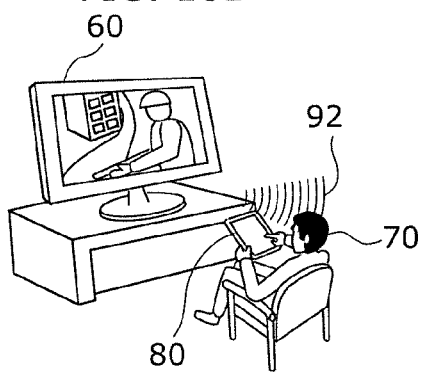
FIG. 10B is a diagram for describing the advantageous effects obtained in Embodiment 2.

FIG. 10A and FIG. 10B are diagrams for describing the advantageous effects obtained in Embodiment 2. FIG. 10A is a diagram conceptually illustrating the sound image localization of the first signal when the first signal is not a dialog signal. FIG. 10B is a diagram conceptually illustrating the sound image localization of the first signal when the first signal is a dialog signal. In FIG. 10A and FIG. 10B, it is assumed that the acoustic signal processing device 10, etc., according to Embodiment 2 is mounted on a domestic television receiver 60 and the left loudspeaker 12 and the right loudspeaker 13 are installed at the left end and the right end, respectively, of the television receiver 60 when viewed from a listener 70. FIG. 10A and FIG. 10B illustrate situations in which the listener 70 is watching the television while watching a tablet computer 80.

As illustrated in FIG. 10A, when the first signal is not a dialog signal, the listener 70 perceives the sound as if a sound image 90 of the first signal was placed in the middle between the left loudspeaker 12 and the right loudspeaker 13. This corresponds to the sound image localization traditionally experienced by watching television. On the other hand, as illustrated in FIG. 10B, when the first signal is a dialog signal, a sound image 92 of the first signal is perceived as if a sound image was placed inside the brain of the listener 70 (placed near the listener 70). This allows the sound image 92 of the first signal to be perceived as approaching the listener 70, and thus dialogue is emphasized out of sounds being heard.

In this manner, the audibility of dialogue can be favorably improved in terms of the sound image localization while background sounds other than the dialogue can be maintained unchanged from the original sounds. Furthermore, since front channel signals can be eliminated, the front loudspeaker is no longer needed.

As described above, with the acoustic signal processing device 10 according to the present embodiment, it is possible to improve the audibility of dialogue with fewer loudspeakers than channels for input signals.

Variation

Although Embodiment 2 describes the sound image localization improvements in the audibility of dialogue, this is not limiting. The audibility of dialogue may be improved in terms of the sound volume and the sound image localization. This will be described below as a variation. Note that the following description focuses on differences from Embodiments 1 and 2.

[Configuration of Front Signal Processor 101B]

Figure 11:
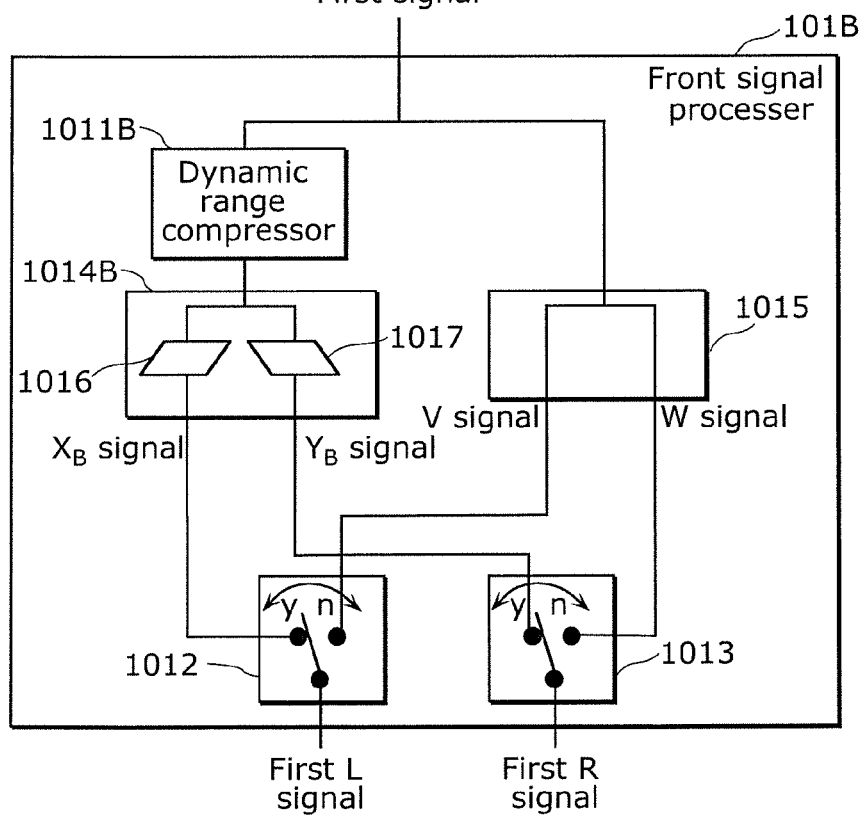
FIG. 11 is a diagram illustrating an example of the detailed configuration of a front signal processor according to a variation of Embodiment 2.

FIG. 11 is a diagram illustrating an example of the detailed configuration of a front signal processor 101B according to a variation of Embodiment 2. Note that elements substantially the same as those in FIG. 5 and FIG. 8 are assigned the same reference numerals and detailed description thereof will be omitted.

As in Embodiments 1 and 2, the front signal processor 101B obtains the first dialog flag from the first flag storage 100 and generates the first L signal and the first R signal by performing signal processing on the first signal. The front signal processor 101B transmits the generated first L signal to the first adder 102 and outputs the generated first R signal to the second adder 103.

In the present embodiment, the front signal processor 101B includes a dynamic range compressor 1011B, a first sound image localizer 1014B, the second sound image localizer 1015, the selector 1012, and the selector 1013, as illustrated in FIG. 11.

The dynamic range compressor 1011B performs signal processing to compress the dynamic range and outputs the resultant signal to the first sound image localizer 1014B. More specifically, the dynamic range compressor 1011B performs signal processing to amplify the first signal when the amplitude of the first signal is small, and attenuate the first signal when the amplitude of the first signal is large, thus compresses the dynamic range of the first signal, and outputs the resultant signal to the first sound image localizer 1014B.

The first sound image localizer 1014B performs signal processing to distribute the first signal having the compressed dynamic range and place the resultant signals at predetermined positions, thereby generating the first L signal and the first R signal. In the present variation, as illustrated in FIG. 11, the first sound image localizer 1014B includes the first phase rotator 1016 and the second phase rotator 1017, and distributes the first signal having the compressed dynamic range as two signals, rotates the phases of the resultant two distributed first signals, and thus generates an $X_B$ signal and a $Y_B$ signal which are two signals having a phase difference of 180 degrees.

The other configurations, etc., are as described in Embodiments 1 and 2, and thus description thereof shall not be repeated.

With this configuration, the audibility of dialogue can be favorably improved in terms of the sound image localization and the sound volume while background sounds other than the dialogue can be maintained unchanged from the original sounds. Furthermore, since front channel signals can be eliminated, the front loudspeaker is no longer needed.

As described above, with the acoustic signal processing device according to the present variation, it is possible to improve the audibility of dialogue with fewer loudspeakers than channels for input signals.

Embodiment 3

Although Embodiment 2 describes the case where the predetermined exclusive channel for dialogue is the first signal, this is not limiting. The second signal and the third signal may be set exclusively for dialogue. Embodiment 3 describes the case where the first to third signals are set to dialog signals. The following description focuses on differences from Embodiment 2.

As described above, the second signal is the left channel signal and the third signal is the right channel signal, and thus in the present embodiment, a crosstalk cancellation process is used. For the crosstalk cancellation process, any existing methods may be used, but a simple method will be described below as an example.

[Crosstalk Cancellation Process]

Figure 12:
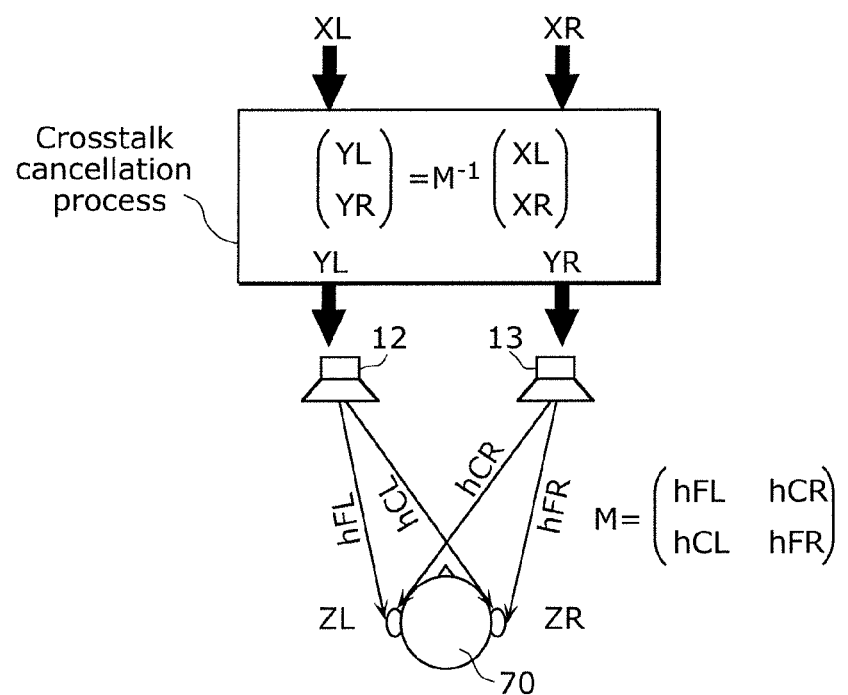
FIG. 12 is a diagram for describing a crosstalk cancellation process.

FIG. 12 is a diagram for describing the crosstalk cancellation process. As illustrated in FIG. 12, the transfer function of a sound from the left loudspeaker 12 to a left-ear area ZL of the listener 70 is denoted as hFL, and the transfer function of a sound from the left loudspeaker 12 to a right-ear area ZR of the listener 70 is denoted as hCL. Similarly, the transfer function of a sound from the right loudspeaker 13 to the left-ear area ZL of the listener 70 is denoted as hCR, and the transfer function of a sound from the right loudspeaker 13 to the right-ear area ZR of the listener 70 is denoted as hFR.

In this case, a transfer function matrix M can be defined as in Expression 1 below.

[Math. 1]
$$M = \begin{pmatrix} hFL & hCR \\ hCL & hFR \end{pmatrix} \quad \text{Expression 1}$$

Here, when an inverse matrix $M^{-1}$ of M is represented by Expression 2, the crosstalk cancellation process corresponds to performing, on input signals XL, XR, the matrix operation represented by Expression 3.

[Math. 2]
$$M^{-1} = \begin{pmatrix} A & C \\ B & D \end{pmatrix} \quad \text{Expression 2}$$

[Math. 3]
$$\begin{pmatrix} A & C \\ B & D \end{pmatrix} \begin{pmatrix} XL \\ XR \end{pmatrix} \quad \text{Expression 3}$$

Furthermore, signals obtained through the matrix operation represented by Expression 3 are output from the left loudspeaker 12 and the right loudspeaker 13. Accordingly, crosstalk components (a ZR component from the left loudspeaker 12 and a ZL component from the right loudspeaker 13) of the sounds of the signals output form the left loudspeaker 12 and the right loudspeaker 13 are cancelled out in a spatial transfer function matrix, and the signal XL reaches the left-ear area ZL and the signal XR reaches the right-ear area ZR.

[Acoustic Signal Processing Device 10C]

Next, each of the functional elements of an acoustic signal processing device 10C will be described with reference to FIG. 13 to FIG. 15. The hardware configuration of the acoustic signal processing device 10C is as described with reference to FIG. 4.

Figure 13:
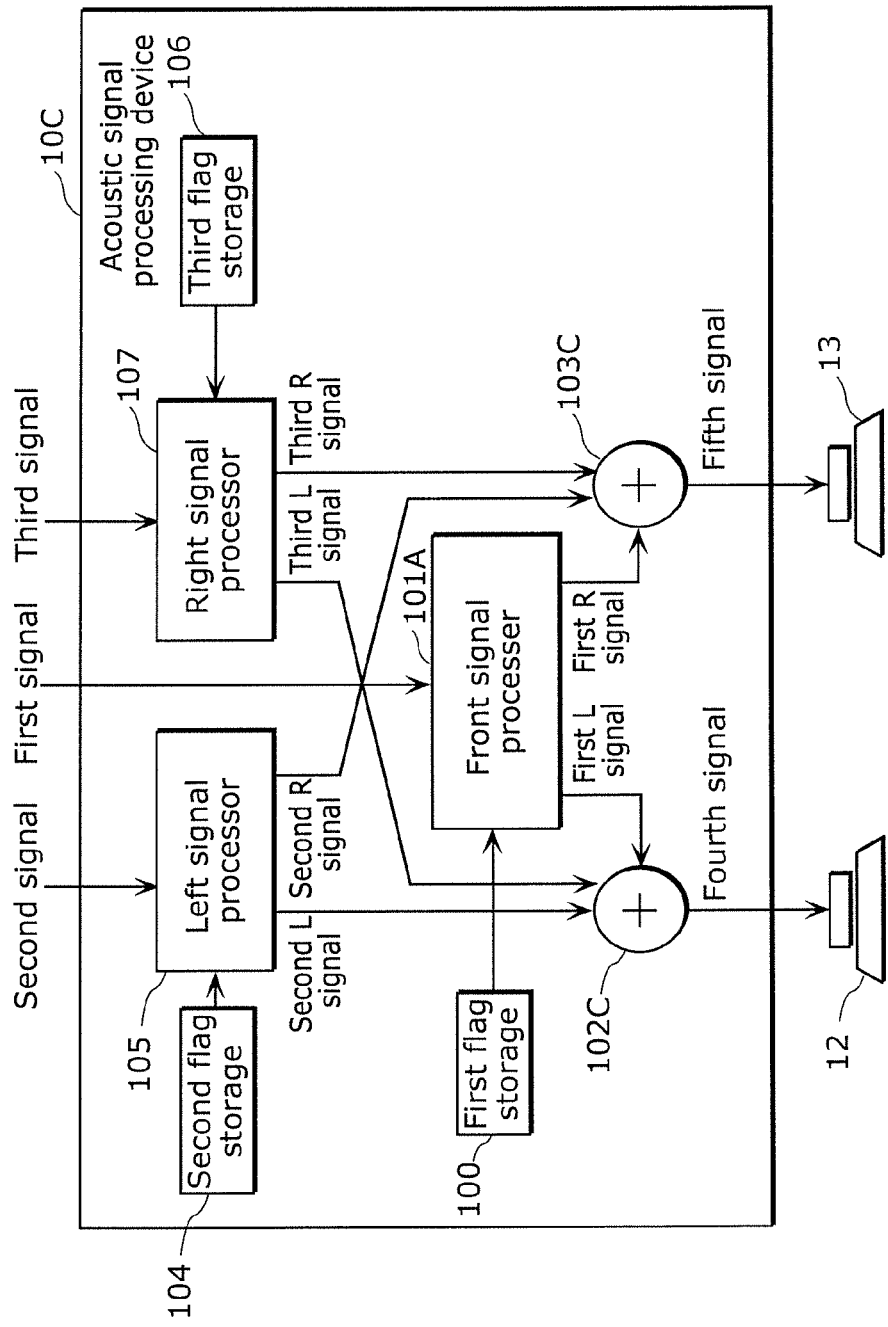
FIG. 13 is a diagram illustrating an example of the configuration of an acoustic signal processing device according to Embodiment 3.

FIG. 13 is a diagram illustrating an example of the configuration of the acoustic signal processing device 10C according to Embodiment 3. Note that elements substantially the same as those in FIG. 5 and FIG. 8, etc., are assigned the same reference numerals and detailed description thereof will be omitted.

The acoustic signal processing device 10C also performs signal processing on the input signal group of multi-channel acoustic signals to output an output signal group including fewer channel signals than channel signals included in the input signal group. In the present embodiment, the acoustic signal processing device 10C includes the first flag storage 100, the front signal processor 101A, a first adder 102C, and a second adder 103C, a second flag storage 104, a left signal processor 105, a third flag storage 106, and a right signal processor 107, as illustrated in FIG. 13. Note that the first flag storage 100, the second flag storage 104, and the third flag storage 106 may be one flag storage instead of being separate elements.

As in Embodiments 1 and 2, in order to simplify description, it is assumed below that the input signal group includes the first signal, the second signal, and the third signal, and the output signal group includes the fourth signal and the fifth signal.

<Second Flag Storage 104>

In the second flag storage 104, a second dialog flag indicating whether the second signal is a dialog signal is stored. The second flag storage 104 is, for example, a memory such as a flash memory or a HDD. In the second flag storage 104, for example, the dialog flag information transmitted from the input processor 11 is stored, and thus the second dialog flag is stored.

<Left Signal Processor 105>

Figure 14:
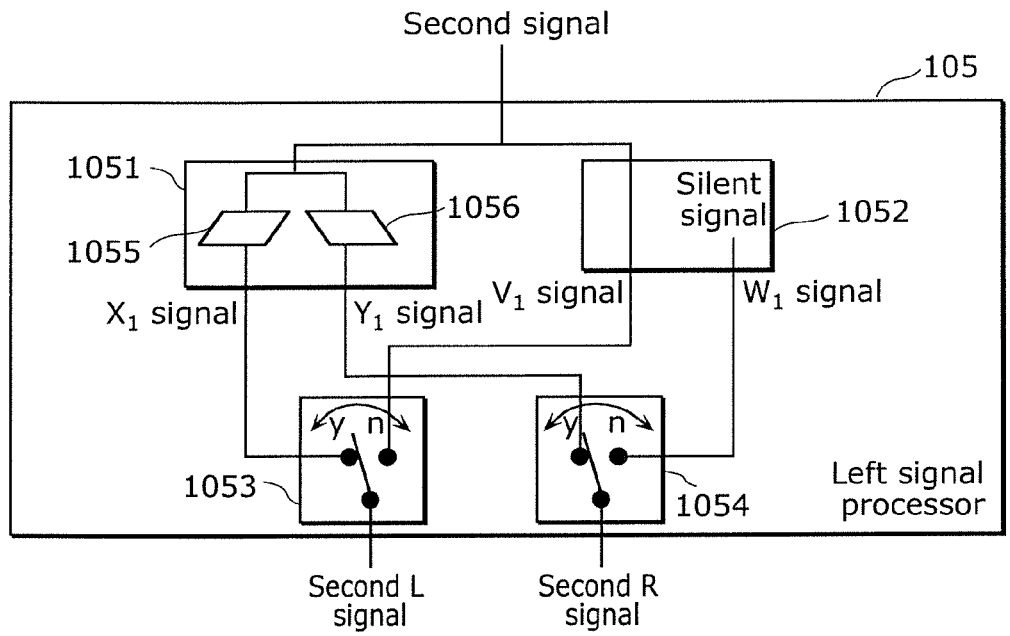
FIG. 14 is a diagram illustrating an example of the detailed configuration of a left signal processor according to Embodiment 3.

FIG. 14 is a diagram illustrating an example of the detailed configuration of the left signal processor 105 according to Embodiment 3.

The left signal processor 105 obtains the second dialog flag from the second flag storage 104 and generates a second L signal and a second R signal by performing signal processing on the second signal. The left signal processor 105 transmits the generated second L signal to the first adder 102C and outputs the generated second R signal to the second adder 103C.

In the present embodiment, the left signal processor 105 includes a first left localizer 1051, a second left localizer 1052, a selector 1053, and a selector 1054, as illustrated in FIG. 14.

<<First Left Localizer 1051>>

The first left localizer 1051 performs signal processing to distribute the second signal and place the resultant signals on the left side of a listener, thereby generating the second L signal and the second R signal. More specifically, the first left localizer 1051 includes a first crosstalk cancellation filter 1055 and a second crosstalk cancellation filter 1056, as illustrated in FIG. 14. The first left localizer 1051 performs signal processing to place the sound images of the second signals on the left side of the listener by applying the crosstalk cancellation process to the distributed second signals, thereby generating the second L signal and the second R signal. In the example illustrated in FIG. 14, the first left localizer 1051 performs signal processing to place the sound images on the left side of the listener by applying the crosstalk cancellation process to the distributed second signals using the first crosstalk cancellation filter 1055 and the second crosstalk cancellation filter 1056, thereby generating two signals, namely, an $X_1$ signal and a $Y_1$ signal.

The first crosstalk cancellation filter 1055 is used for generating a signal to which the crosstalk cancellation process is applied and based on which the sound is output from the left loudspeaker 12; for example, the first crosstalk cancellation filter 1055 treats a transfer function A in the spatial transfer function matrix represented by Expression 2 indicated above. Note that the crosstalk cancellation process here is signal processing to control the second signal so that upon the sound output from the left loudspeaker 12 and the right loudspeaker 13, the sound does not reach an area around the right ear of a listener. The first crosstalk cancellation filter 1055 generates the $X_1$ signal as an output signal and outputs the $X_1$ signal. The second crosstalk cancellation filter 1056 is used for generating a signal to which the crosstalk cancellation process is applied and based on which the sound is output from the right loudspeaker 13; for example, the second crosstalk cancellation filter 1056 treats a transfer function B in the spatial transfer function matrix represented by Expression 2 indicated above. Note that the crosstalk cancellation process here is signal processing to control the second signal so that upon the sound output from the left loudspeaker 12 and the right loudspeaker 13, the sound does not reach the area around the right ear of the listener. The second crosstalk cancellation filter 1056 generates the $Y_1$ signal as an output signal and outputs the $Y_1$ signal.

When the second signal is a dialog signal, the $X_1$ signal generated by the first crosstalk cancellation filter 1055 is output to the first adder 102C as the second L signal using the selector 1053. When the second signal is a dialog signal, the $Y_1$ signal generated by the second crosstalk cancellation filter 1056 is output to the second adder 103C as the second R signal using the selector 1054.

In this manner, using the first crosstalk cancellation filter 1055 and the second crosstalk cancellation filter 1056, the first left localizer 1051 can generate a signal such that when the sound based on the second signal is output from the left loudspeaker 12 and the right loudspeaker 13, the sound is perceived as if the sound image of the second signal was placed at the left ear of a listener. This is because the sound does not reach the right ear of the listener while the sound reaches only the left ear of the listener and the sound is perceived as if the sound image was placed at the left ear of the listener.

<<Second Left Localizer 1052>>

When the second dialog flag indicates that the second signal is not a dialog signal, the second left localizer 1052 performs signal processing to place the sound image of the second signal at a position different from the position at which the first left localizer 1051 places the sound image of the second signal, thereby generating the second L signal and the second R signal. More specifically, the second left localizer 1052 performs signal processing to place the sound image of the second signal on the left side of the listener without applying the crosstalk cancellation process to the second signal, thereby generating the second L signal and the second R signal. In the example illustrated in FIG. 14, the second left localizer 1052 generates a $V_1$ signal from the second signal by allowing direct passage thereof without performing the signal processing thereon, and separately generates a $W_1$ signal from a silent signal.

When the second signal is not a dialog signal, the $V_1$ signal generated by the second left localizer 1052 is output to the first adder 102C as the second L signal using the selector 1053. When the second signal is not a dialog signal, the $W_1$ signal generated by the second left localizer 1052 is output to the second adder 103C as the second R signal using the selector 1054.

In this manner, the second left localizer 1052 can generate a signal such that when the sound based on the second signal is output from the left loudspeaker 12 and the right loudspeaker 13, the sound image of the second signal is placed at the position of the left loudspeaker 12. This is because the sound based on the second signal is output only from the left loudspeaker 12 while no sound is output from the right loudspeaker 13.

<<Selector 1053>>

The selector 1053 performs signal switching according to the second dialog flag indicating whether the second signal is a dialog signal, and outputs the second L signal to the first adder 102C.

For example, when the second dialog flag indicates that the second signal is a dialog signal, the selector 1053 outputs the $X_1$ signal, which is one of the distributed second signals resulting from the signal processing using the crosstalk cancellation process to place the sound image on the left side of the listener, to the first adder 102C as the second L signal. On the other hand, when the second dialog flag indicates that the second signal is not a dialog flag, the selector 1053 outputs the $V_1$ signal, which is the second signal, to the first adder 102C as the second L signal.

<<Selector 1054>>

The selector 1054 performs signal switching according to the second dialog flag indicating whether the second signal is a dialog signal, and outputs the second R signal to the second adder 103C.

For example, when the second dialog flag indicates that the second signal is a dialog signal, the selector 1054 outputs the $Y_1$ signal, which is the other of the distributed second signals resulting from the signal processing using the crosstalk cancellation process to place the sound image on the left side of the listener, to the second adder 103C as the second R signal. On the other hand, when the second dialog flag indicates that the second signal is not a dialog flag, the selector 1054 outputs the $W_1$ signal, which is a silent signal, to the second adder 103C as the second R signal.

<Third Flag Storage 106>

In the third flag storage 106, a third dialog flag indicating whether the third signal is a dialog signal is stored. The third flag storage 106 is, for example, a memory such as a flash memory or a HDD. In the third flag storage 106, for example, the dialog flag information transmitted from the input processor 11 is stored, and thus the third dialog flag is stored.

<Right Signal Processor 107>

Figure 15:
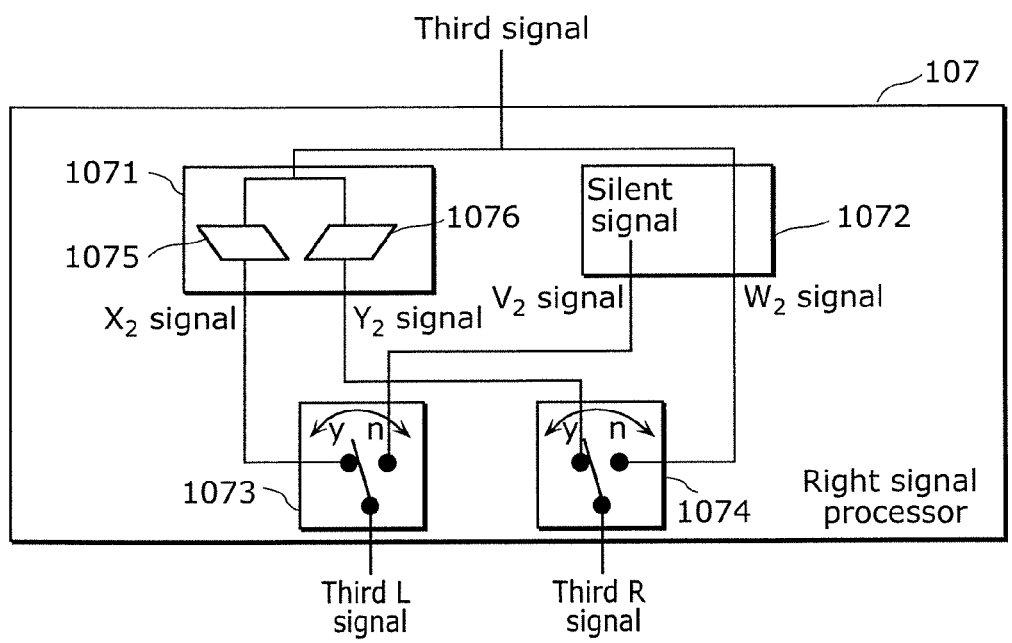
FIG. 15 is a diagram illustrating an example of the detailed configuration of a right signal processor according to Embodiment 3.

FIG. 15 is a diagram illustrating an example of the detailed configuration of the right signal processor 107 according to Embodiment 3.

The right signal processor 107 obtains the third dialog flag from the third flag storage 106 and generates a third L signal and a third R signal by performing signal processing on the third signal. The right signal processor 107 transmits the generated third L signal to the first adder 102C and outputs the generated third R signal to the second adder 103C.

In the present embodiment, the right signal processor 107 includes a first right localizer 1071, a second right localizer 1072, a selector 1073, and a selector 1074, as illustrated in FIG. 15.

<<First Right Localizer 1071>>

The first left localizer 1071 performs signal processing to distribute the third signal and place the resultant signals on the right side of a listener, thereby generating the third L signal and the third R signal. More specifically, the first right localizer 1071 includes a third crosstalk cancellation filter 1075 and a fourth crosstalk cancellation filter 1076, as illustrated in FIG. 15. The first right localizer 1071 performs signal processing to place the sound images of the third signals on the right side of the listener by applying the crosstalk cancellation process to the distributed third signals, thereby generating the third L signal and the third R signal. In the example illustrated in FIG. 15, the first right localizer 1071 performs signal processing to place the sound images on the right side of the listener by applying the crosstalk cancellation process to the distributed third signals using the third crosstalk cancellation filter 1075 and the fourth crosstalk cancellation filter 1076, thereby generating two signals, namely, an $X_2$ signal and a $Y_2$ signal.

The third crosstalk cancellation filter 1075 is used for generating a signal to which the crosstalk cancellation process is applied and based on which the sound is output from the left loudspeaker 12; for example, the third crosstalk cancellation filter 1075 treats a transfer function C in the spatial transfer function matrix represented by Expression 2 indicated above. Note that the crosstalk cancellation process here is signal processing to control the third signal so that upon the sound output from the left loudspeaker 12 and the right loudspeaker 13, the sound does not reach an area around the left ear of the listener. The third crosstalk cancellation filter 1075 generates the $X_2$ signal as an output signal and outputs the $X_2$ signal. The fourth crosstalk cancellation filter 1076 is used for generating a signal to which the crosstalk cancellation process is applied and based on which the sound is output from the right loudspeaker 13; for example, the fourth crosstalk cancellation filter 1076 treats a transfer function D in the spatial transfer function matrix represented by Expression 2 indicated above. Note that the crosstalk cancellation process here is signal processing to control the third signal so that upon the sound output from the left loudspeaker 12 and the right loudspeaker 13, the sound does not reach the area around the left ear of the listener. The fourth crosstalk cancellation filter 1076 generates the $Y_2$ signal as an output signal and outputs the $Y_2$ signal.

When the third signal is a dialog signal, the $X_2$ signal generated by the third crosstalk cancellation filter 1075 is output to the first adder 102C as the third L signal using the selector 1073. When the third signal is a dialog signal, the $Y_2$ signal generated by the fourth crosstalk cancellation filter 1076 is output to the second adder 103C as the third R signal using the selector 1074.

In this manner, using the third crosstalk cancellation filter 1075 and the fourth crosstalk cancellation filter 1076, the first right localizer 1071 can generate a signal such that when the sound based on the third signal is output from the left loudspeaker 12 and the right loudspeaker 13, the sound is perceived as if the sound image of the third signal was placed at the right ear of the listener. This is because the sound does not reach the left ear of the listener while the sound reaches only the right ear of the listener and the sound is perceived as if the sound image was placed at the right ear of the listener.

<<Second Right Localizer 1072>>

When the third dialog flag indicates that the third signal is not a dialog signal, the second right localizer 1072 performs signal processing to place the sound image of the third signal at a position different from the position at which the first right localizer 1071 places the sound image of the third signal, thereby generating the third L signal and the third R signal. More specifically, the second right localizer 1072 performs signal processing to place the sound image of the third signal on the right side of the listener without applying the crosstalk cancellation process to the third signal, thereby generating the third L signal and the third R signal. In the example illustrated in FIG. 15, the second right localizer 1072 separately generates a $V_2$ signal from a silent signal, and generates a $W_2$ signal from the third signal by allowing direct passage thereof without performing the signal processing thereon.

When the third signal is not a dialog signal, the $V_2$ signal generated by the second right localizer 1072 is output to the first adder 102C as the third L signal using the selector 1073. When the third signal is not a dialog signal, the $W_2$ signal generated by the second right localizer 1072 is output to the second adder 103C as the third R signal using the selector 1074.

In this manner, the second right localizer 1072 can generate a signal such that when the sound based on the third signal is output from the left loudspeaker 12 and the right loudspeaker 13, the sound image of the third signal is placed at the position of the right loudspeaker 13. This is because the sound based on the third signal is output only from the right loudspeaker 13 while no sound is output from the left loudspeaker 12.

<<Selector 1073>>

The selector 1073 performs signal switching according to the third dialog flag indicating whether the third signal is a dialog signal, and outputs the third L signal to the first adder 102C.

For example, when the third dialog flag indicates that the third signal is a dialog flag, the selector 1073 outputs the $X_2$ signal, which is one of the distributed third signals resulting from the signal processing using the crosstalk cancellation process to place the third image on the right side of the listener, to the first adder 102C as the third L signal. On the other hand, when the third dialog flag indicates that the third signal is not a dialog flag, the selector 1073 outputs the $V_2$ signal, which is a silent signal, to the first adder 102C as the third L signal.

<<Selector 1074>>

The selector 1074 performs signal switching according to the third dialog flag indicating whether the third signal is a dialog signal, and outputs the third R signal to the second adder 103C.

For example, when the third dialog flag indicates that the third signal is a dialog signal, the selector 1074 outputs the $Y_2$ signal, which is the other of the distributed third signals resulting from the signal processing using the crosstalk cancellation process to place the sound image on the right side of the listener, to the second adder 103C as the third R signal. On the other hand, when the third dialog flag indicates that the third signal is not a dialog flag, the selector 1074 outputs the $W_2$ signal, which is the third signal, to the second adder 103C as the third R signal.

<First Adder 102C>

The first adder 102C defines, as the fourth signal which is the left channel signal included in the output signal group, a signal obtained by adding the first L signal, the second L signal, and the third L signal. More specifically, the first adder 102C generates the fourth signal by adding the first L signal input by the front signal processor 101A, the second L signal input by the left signal processor 105, and the third L signal input by the right signal processor 107, and outputs the fourth signal to the left loudspeaker 12.

<Second Adder 103C>

The second adder 103C defines, as the fifth signal which is the right channel signal included in the output signal group, a signal obtained by adding the first R signal, the second R signal and the third R signal. More specifically, the second adder 103C generates the fifth signal by adding the first R signal input by the front signal processor 101A, the second R signal input by the left signal processor 105, and the third R signal input by the right signal processor 107, and outputs the fifth signal to the right loudspeaker 13.

[Advantageous Effects, etc.]

With the acoustic signal processing device 10C according to the present embodiment, when the first signal is a dialog signal, the signal processing to distribute the first signal as two signals and place the two signals at the predetermined positions so that the sound image is perceived as if the sound image was placed inside the brain of a listener (placed near the listener) is performed, and then the two signals are output as the first L signal and the first R signal. Furthermore, when the second signal is a dialog signal, the signal processing to distribute the second signal as two signals and place the two signals at the left ear of the listener is performed, and then the two signals are output as the second L signal and the second R signal. Moreover, when the third signal is a dialog signal, the signal processing to distribute the third signal as two signals and place the two signals at the right ear of the listener is performed, and then the two signals are output as the third L signal and the third R signal.

Accordingly, as compared to the sound image of the second signal that is not a dialog signal, the sound image of the second signal that is a dialog signal is perceived as if the sound image is placed near the listener, and thus it is possible to make dialogue such as lines easier for the listener to hear. Similarly, as compared to the sound image of the third signal that is not a dialog signal, the sound image of the third signal that is a dialog signal is perceived as if the sound image is placed near the listener, and thus it is possible to make dialogue such as lines easier for the listener to hear. In this manner, the audibility of dialogue can be improved with fewer loudspeakers than channels for input signals.

Furthermore, as a result of the crosstalk cancellation process, the sound based on the second signal that is a dialog signal is perceived as if the sound image of the second signal was placed at the left ear of the listener, and thus it is possible to make dialogue such as lines easier for the listener to hear. Similarly, as a result of the crosstalk cancellation process, the sound based on the third signal that is a dialog signal is perceived as if the sound image of the third signal was placed at the right ear of the listener, and thus it is possible to make dialogue such as lines easier for the listener to hear.

Figure 16A:
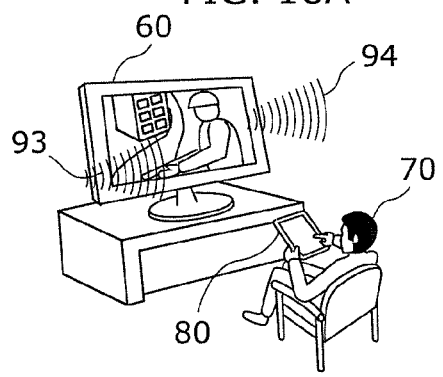
FIG. 16A is a diagram for describing the advantageous effects obtained in Embodiment 3.
Figure 16B:
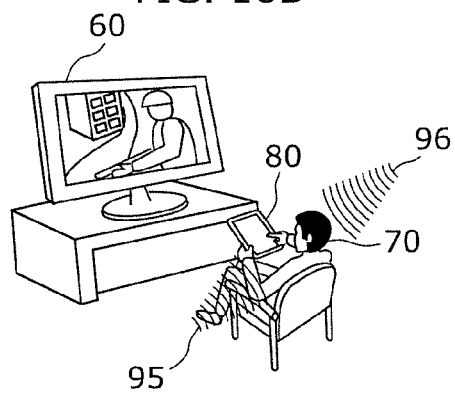
FIG. 16B is a diagram for describing the advantageous effects obtained in Embodiment 3.

FIG. 16A and FIG. 16B are diagrams for describing the advantageous effects obtained in Embodiment 3. Note that elements substantially the same as those in FIG. 10A and FIG. 10B are assigned the same reference numerals and detailed description thereof will be omitted. FIG. 16A is a diagram conceptually illustrating the sound image localization of the second signal and the third signal when the second signal and the third signal are not dialog signals. FIG. 16B is a diagram conceptually illustrating the sound image localization of the second signal and the third signal when the second signal and the third signal are not dialog signals.

As illustrated in FIG. 16A, when the second signal and the third signal are not dialog signals, the listener 70 perceives the sound as if a sound image 93 of the second signal was placed at the position of the left loudspeaker 12 and a sound image 94 of the third signal was placed at the position of the right loudspeaker 13. This corresponds to the sound image localization traditionally experienced by watching television. On the other hand, as illustrated in FIG. 16B, when the second signal and the third signal are dialog signals, the listener 70 perceives the sound as if a sound image 95 of the second signal was placed at the left ear of the listener 70 and a sound image 96 of the third signal was placed at the right ear of the listener 70. Accordingly, the sound image 95 of the second signal and the sound image 96 of the third signal allow not only an improvement in the audibility of dialogue for the listener 70, but also an improvement in the sense of presence.

In this manner, the audibility of dialogue can be favorably improved in terms of the sound image localization while background sounds other than the dialogue can be maintained unchanged from the original sounds. Furthermore, since front channel signals can be eliminated, the front loudspeaker is no longer needed.

As described above, with the acoustic signal processing device 10C according to the present embodiment, it is possible to improve the audibility of dialogue with fewer loudspeakers than channels for input signals.

Note that in Embodiment 3, the second signal is, for example, allocated to FLc in the 22.2 ch standard, but the second signal may be allocated to, for example, FL or BtFL, as long as the second signal is allocated to a channel on the left side of a listener as described above. Furthermore, with the acoustic signal processing device 10C according to Embodiment 3, in a viewing environment including only 2 ch loudspeakers, when the signal allocated to a channel on the left side of a listener represents dialogue, the signal is placed at an ear of the listener. A signal in the 22.2 ch that does not represent dialogue may be down-mixed into a 2 ch signal by a normal down-mixing process. Any down-mixing process may be used; for example, the down-mixing expressions cited in the NPL 1 may be used. Here, the down-mixing expressions (1) to (8) cited in the NPL 1 are equations applied regardless of whether a signal in each channel represents dialogue. In the case of applying these down-mixing expressions to the present embodiment, it is sufficient that the down-mixing process be performed for channels other than the channel for dialogue.

Embodiment 4

Although Embodiment 3 describes improvements in the audibility of dialogue that are made by placing, when the second signal and the third signal are dialog signals, the sound images thereof at the left ear and the right ear of a listener , this is not limiting. The sound images may be placed at predetermined loudspeaker positions for signals that are allocated to the second signal and the third signal. Note that the system and the configuration of the input processor 11 according to Embodiment 4 are substantially the same as those described in Embodiment 1, etc.; thus, the configuration of an acoustic signal processing device 10D according to Embodiment 4 will be described, focusing on differences from Embodiment 3.

In the present embodiment, using the crosstalk cancellation process, the sound images of the second signal and the third signal are virtually placed at intended loudspeaker positions (virtual sound image localization). A simple method of a virtual sound image localization process will be described below as an example.

[Virtual Sound Image Localization Process]

Figure 17:
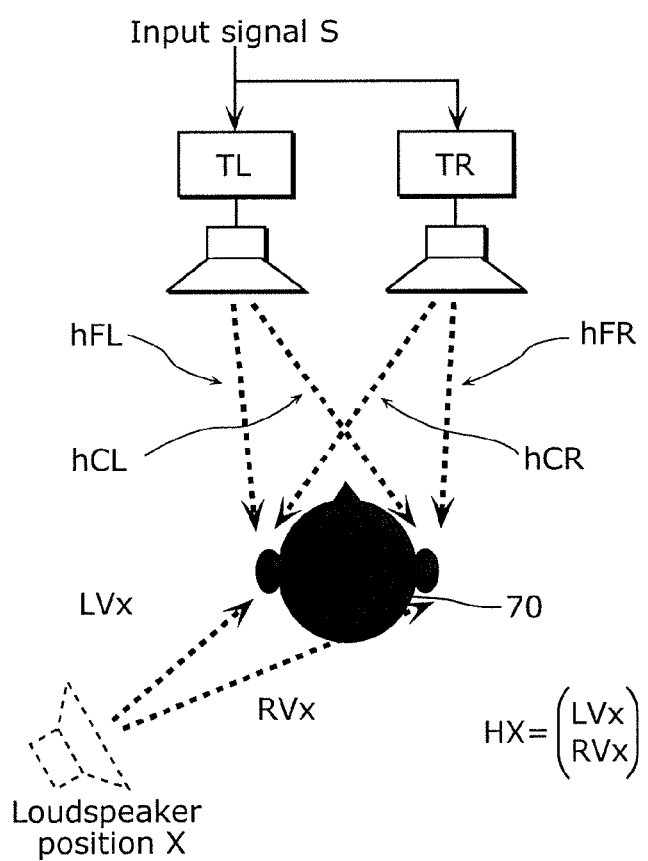
FIG. 17 is a diagram for describing a virtual sound image localization process.

FIG. 17 is a diagram for describing the virtual sound image localization process. FIG. 17 illustrates an example of when the position (virtual sound image position) of a sound image of an output input signal S is a loudspeaker position X. Here, a transfer function HX illustrated in FIG. 17 is a transfer function of sounds reaching the both ears of a listener from the loudspeaker X; the transfer function HX includes a set of a transfer function LVx reaching the left ear of the listener from the loudspeaker X and a transfer function RVx reaching the right ear of the listener from the loudspeaker X.

In order that the position of the sound image of the output input signal S (virtual sound image position) matches the loudspeaker position X, it is sufficient that the transfer functions TL, TR, the transfer functions HX, and a spatial transfer function matrix between each of the left and right real loudspeakers and the listener 70 have such relationship as that represented in Expression 4 below. The transfer function HX and the spatial transfer function matrix between each of the left and right real loudspeakers and the listener 70 can be measured or calculated in advance, and thus sounds based on signals output from the left and right real loudspeakers through application of the transfer functions TL, TR to the input signal S are perceived as if the sounds were output from the loudspeaker placed at the loudspeaker position X.

[Math. 4]

$$\begin{pmatrix} TL \\ TR \end{pmatrix} = \begin{pmatrix} hFL & hcR \\ hCL & hFR \end{pmatrix}^{-1} \times \begin{pmatrix} LVx \\ RVx \end{pmatrix}$$ Expression 4

Here, Expression 4 indicates that multiplication of the input signal S by the transfer function HX, followed by the crosstalk cancellation process (multiplication of an inverse matrix of the spatial transfer function matrix), leads to the phenomenon in which sound is perceived as if the sound was output from the loudspeaker position X.

FIG. 18 is a diagram illustrating an example of a transfer function group storage table in the 22.2 ch standard. In the transfer function group storage table illustrated in FIG. 18, the transfer function between each of the left and right ears of the listener 70 and each of various loudspeaker positions X serving as the virtual sound image position is stored in association with the loudspeaker position X as an index. The right column in the transfer function group storage table illustrated in FIG. 18 includes two elements. The left one of the two elements is a transfer function between the loudspeaker position X and the left ear of the listener 70, and the right one of the two elements is a transfer function between the loudspeaker position X and the right ear of the listener 70. Here, the 22.2 ch channel labels in the ARIB standard are used as an example of the index.

The respective loudspeaker positions corresponding to the channel labels are defined in the ARIB standard. Therefore, the transfer function (LVx, RVx) between the loudspeaker position defined in the ARIB standard and the left and right ears of a listener can be measured and stored in advance in the transfer function group storage table. Note that instead of the transfer function (LVx, RVx), a transfer function obtained by previously performing, on the transfer function (LVx, RVx), an inverse matrix operation of the crosstalk cancellation process may be stored in the transfer function group storage table.

[Acoustic Signal Processing Device 10D]

Next, each of the functional elements of the acoustic signal processing device 10D will be described with reference to FIG. 19 to FIG. 21. The hardware configuration of the acoustic signal processing device 10D is as described with reference to FIG. 4.

Figure 19:
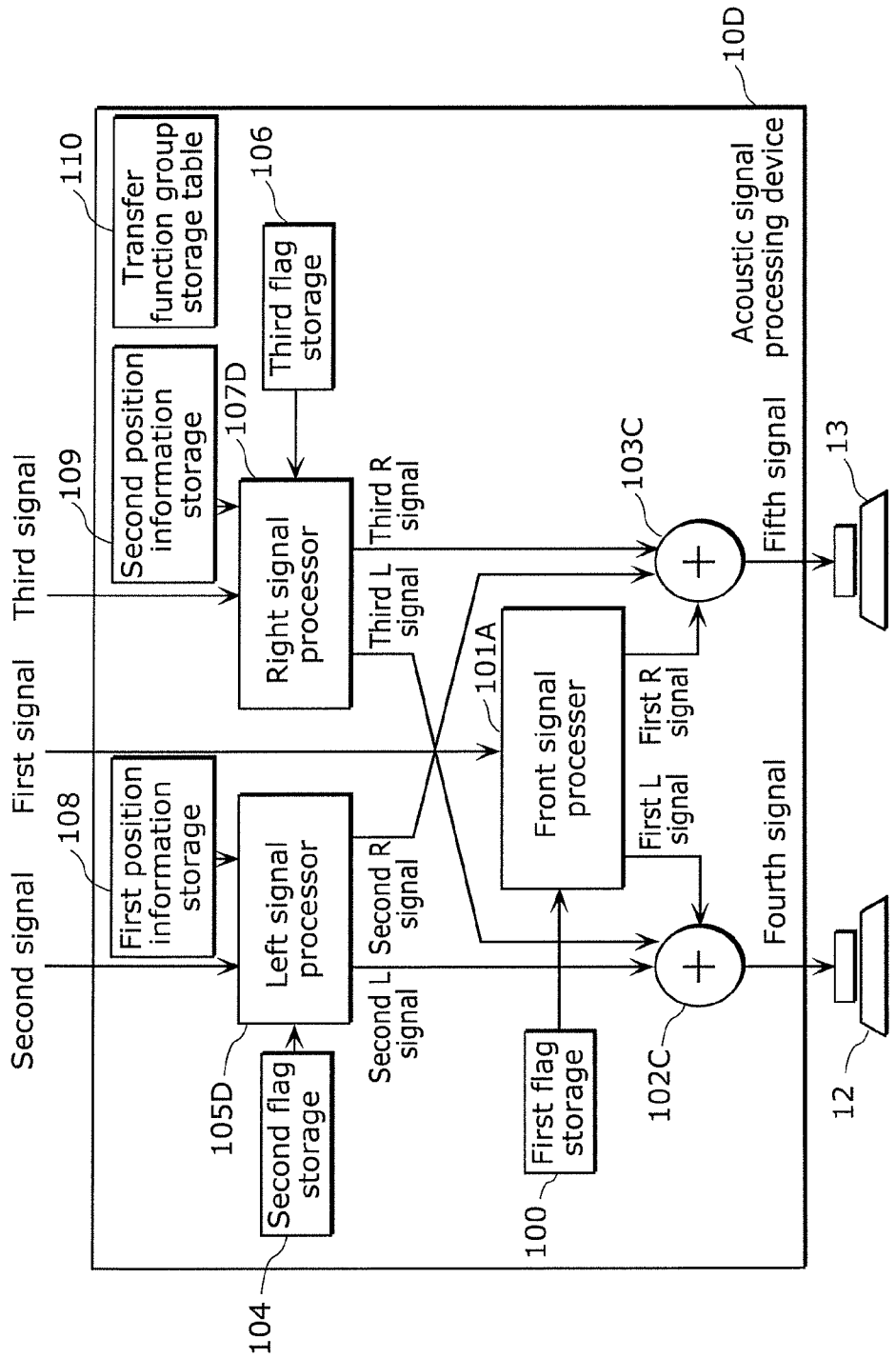
FIG. 19 is a block diagram illustrating an example of the configuration of an acoustic signal processing device according to Embodiment 4.

FIG. 19 is a diagram illustrating an example of the configuration of the acoustic signal processing device 10D according to Embodiment 4. Note that elements substantially the same as those in FIG. 13 are assigned the same reference numerals and detailed description thereof will be omitted.

The acoustic signal processing device 10D illustrated in FIG. 19 is different from the acoustic signal processing device 10C illustrated in FIG. 13 according to Embodiment 3 in that a first position information storage 108, a second position information storage 109, and a transfer function group storage table 110 are added and a left signal processor 105D and a right signal processor 107D have different configurations. The other configurations are as described in Embodiment 3, and thus description thereof shall not be repeated. Note that the first position information storage 108 and the second position information storage 109 may be one position information storage instead of being separate elements.

<Transfer Function Group Storage Table 110>

In the transfer function group storage table 110, a transfer function of sounds reaching the both ears of a listener from each of a plurality of loudspeaker positions is stored for each loudspeaker position. The transfer function group storage table 110 may be that illustrated in FIG. 18 as long as the multi-channel is 22.2 ch. The present embodiment is described assuming that the multi-channel is 22.2 ch.

<First Position Information Storage 108>

In the first position information storage 108, loudspeaker position information for specifying the loudspeaker position allocated to the second signal is stored. In the present embodiment, the channel label corresponding to the second signal is stored in the first position information storage 108.

<Second Position Information Storage 109>

In the second position information storage 109, loudspeaker position information for specifying the loudspeaker position allocated to the third signal is stored. In the present embodiment, the channel label corresponding to the third signal is stored in the second position information storage 109.

<Left Signal Processor 105D>

Figure 20:
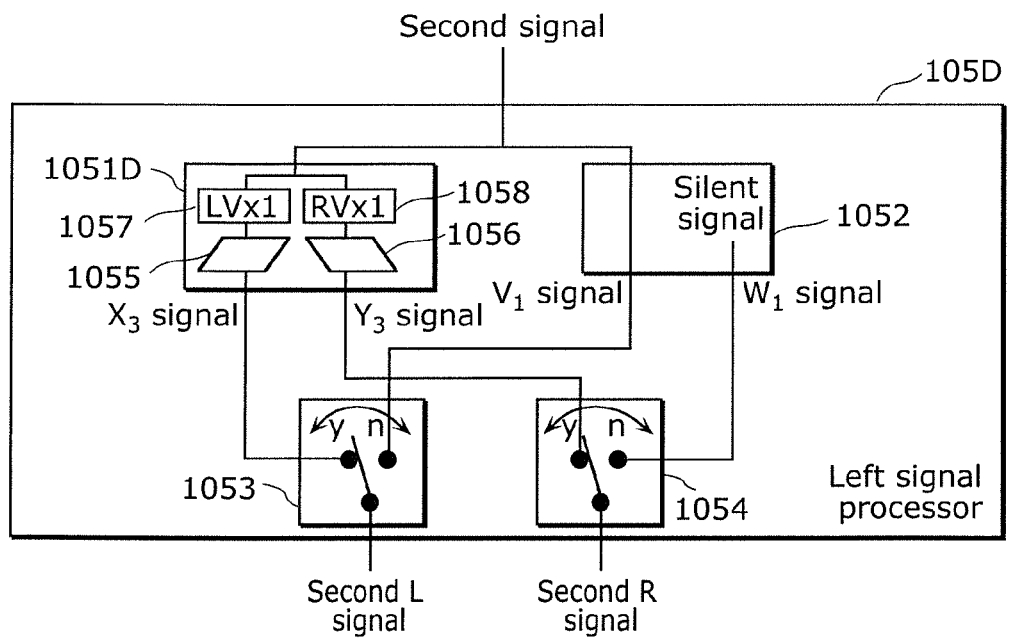
FIG. 20 is a diagram illustrating an example of the detailed configuration of a left signal processor according to Embodiment 4.

FIG. 20 is a diagram illustrating an example of the detailed configuration of the left signal processor 105D according to Embodiment 4. Note that elements substantially the same as those in FIG. 14 are assigned the same reference numerals and detailed description thereof will be omitted.

The left signal processor 105D obtains the second dialog flag from the second flag storage 104 and generates a second L signal and a second R signal by performing signal processing on the second signal with reference to the first position information storage 108 and the transfer function group storage table 110. The left signal processor 105D transmits the generated second L signal to the first adder 102C and outputs the generated second R signal to the second adder 103C.

In the present embodiment, the left signal processor 105D includes a first left localizer 1051D, the second left localizer 1052, the selector 1053, and the selector 1054, as illustrated in FIG. 20.

<<First Left Localizer 1051D>>

The first left localizer 1051D specifies a first loudspeaker position allocated to the second signal with reference to the first position information storage 108 and obtains a first transfer function between the first loudspeaker position and the both ears of a listener from the specified first loudspeaker position and the transfer function group storage table 110. Furthermore, the first left localizer 1051D performs signal processing to place the sound image at the first loudspeaker position by applying a process of the first transfer function to the second signal and applying the crosstalk cancellation process to the second signal.

In the present embodiment, the first left localizer 1051D includes a left virtual position filter 1057 and a right virtual position filter 1058, as illustrated in FIG. 20. The first left localizer 1051D retrieves a channel label from the first position information storage 108 and refers to the transfer function group storage table 110 using the retrieved channel label as an index. Furthermore, the first left localizer 1051D multiplies the second signal with the transfer function specified using the index and then performs the crosstalk cancellation process.

In the example illustrate in FIG. 20, using the left virtual position filter 1057 and the right virtual position filter 1058, the first left localizer 1051D applies the virtual sound image localization process to each of the distributed second signals. Furthermore, using the first crosstalk cancellation filter 1055 and the second crosstalk cancellation filter 1056, the first left localizer 1051D generates two signals, namely, an $X_3$ signal and a $Y_3$ signal. Note that the virtual sound image localization process here is signal processing to control the second signal so that upon the sound output from the left loudspeaker 12 and the right loudspeaker 13, the sound is perceived as if the sound image of the second signal was placed at the loudspeaker position allocated to the second signal.

The left virtual position filter 1057 is used for generating a signal to which the virtual sound image localization process is applied and based on which the sound is output from the left loudspeaker 12. More specifically, the left virtual position filter 1057 specifies the loudspeaker position allocated to the second signal with reference to the first position information storage 108. On the basis of the specified loudspeaker position, the left virtual position filter 1057 obtains (or calculates) a first L transfer function between the specified loudspeaker position and the left ear of a listener from the transfer function group storage table 110. Here, the first L transfer function is the left element of HX retrieved from the transfer function group storage table 110. The left virtual position filter 1057 multiplies one of the distributed second signals with the obtained first L transfer function and outputs the resultant signal to the first crosstalk cancellation filter 1055. Subsequently, the first crosstalk cancellation filter 1055 generates the $X_3$ signal, and when the second signal is a dialog signal, the generated $X_3$ signal is output to the first adder 102C as the second L signal using the selector 1053.

The right virtual position filter 1058 is used for generating a signal to which the virtual sound image localization process is applied and based on which the sound is output from the right loudspeaker 13. More specifically, the right virtual position filter 1058 specifies the loudspeaker position allocated to the second signal with reference to the first position information storage 108. On the basis of the specified loudspeaker position, the right virtual position filter 1058 obtains (or calculates) a first R transfer function between the specified loudspeaker position and the right ear of the listener from the transfer function group storage table 110. Here, the first R transfer function is the right element of HX retrieved from the transfer function group storage table 110. The right virtual position filter 1058 multiplies the other of the distributed second signals with the obtained first R transfer function and outputs the resultant signal to the second crosstalk cancellation filter 1056. Subsequently, the second crosstalk cancellation filter 1056 generates the $Y_3$ signal, and when the second signal is a dialog signal, the generated $Y_3$ signal is output to the second adder 103C as the second R signal using the selector 1054.

<Right Signal Processor 107D>

Figure 21:
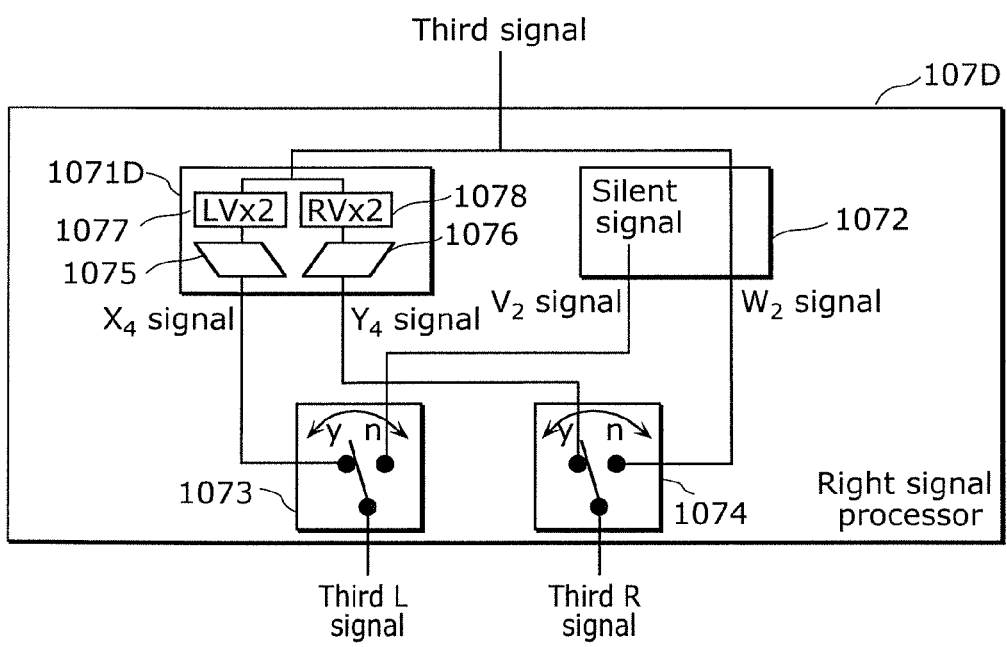
FIG. 21 is a diagram illustrating an example of the detailed configuration of a right signal processor according to Embodiment 4.

FIG. 21 is a diagram illustrating an example of the detailed configuration of the right signal processor 107D according to Embodiment 4. Note that elements substantially the same as those in FIG. 15 are assigned the same reference numerals and detailed description thereof will be omitted.

The right signal processor 107D obtains the third dialog flag from the third flag storage 106 and generates the third L signal and the third R signal by performing signal processing on the third signal with reference to the second position information storage 109 and the transfer function group storage table 110. The right signal processor 107D transmits the generated third L signal to the first adder 102C and outputs the generated third R signal to the second adder 103C.

In the present embodiment, the right signal processor 107D includes a first right localizer 1071D, the second right localizer 1072, the selector 1073, and the selector 1074, as illustrated in FIG. 21.

<<First Right Localizer 1071D>>

The first right localizer 1071D specifies a second loudspeaker position allocated to the third signal with reference to the second position information storage 109 and obtains a second transfer function between the second loudspeaker position and the both ears of the listener from the specified second loudspeaker position and the transfer function group storage table 110. Furthermore, the first right localizer 1071D performs signal processing to place the sound image at the second loudspeaker position by applying a process of the second transfer function to the third signal and applying the crosstalk cancellation process to the third signal.

In the present embodiment, the first right localizer 1071D includes a left virtual position filter 1077 and a right virtual position filter 1078, as illustrated in FIG. 21. The first right localizer 1071D retrieves a channel label from the second position information storage 109 and refers to the transfer function group storage table 110 using the retrieved channel label as the index. Furthermore, the first right localizer 1071D multiplies the third signal with the transfer function specified using the index and then performs the crosstalk cancellation process.

In the example illustrated in FIG. 21, using the left virtual position filter 1077 and the right virtual position filter 1078, the first right localizer 1071D applies the virtual sound image localization process to each of the distributed third signals. Furthermore, using the third crosstalk cancellation filter 1075 and the fourth crosstalk cancellation filter 1076, the first right localizer 1071D generates two signals, namely, an $X_4$ signal and a $Y_4$ signal. Note that the virtual sound image localization process here is signal processing to control the third signal so that upon the sound output from the left loudspeaker 12 and the right loudspeaker 13, the sound is perceived as if the sound image of the third signal was placed at the loudspeaker position allocated to the third signal.

The left virtual position filter 1077 is for generating a signal to which the virtual sound image localization process is applied and based on which the sound is output from the left loudspeaker 12. More specifically, the left virtual position filter 1077 specifies the loudspeaker position allocated to the third signal with reference to the second position information storage 109. On the basis of the specified loudspeaker position, the left virtual position filter 1077 obtains (or calculates) a second L transfer function between the specified loudspeaker position and the left ear of the listener from the transfer function group storage table 110. Here, the second L transfer function is the left element of HX retrieved from the transfer function group storage table 110. The left virtual position filter 1077 multiplies one of the distributed third signals with the obtained second L transfer function and outputs the resultant signal to the third crosstalk cancellation filter 1075. Subsequently, the third crosstalk cancellation filter 1075 generates the $X_4$ signal, and when the third signal is a dialog signal, the generated $X_4$ signal is output to the first adder 102C as the third L signal using the selector 1073.

The right virtual position filter 1078 is for generating a signal to which the virtual sound image localization process is applied and based on which the sound is output from the right loudspeaker 13.

The right virtual position filter 1078 generates the $Y_4$ signal as an output signal and outputs the $Y_4$ signal. More specifically, the right virtual position filter 1078 specifies the loudspeaker position allocated to the third signal with reference to the second position information storage 109. On the basis of the specified loudspeaker position, the right virtual position filter 1078 obtains (or calculates) a second R transfer function between the specified loudspeaker position and the right ear of the listener from the transfer function group storage table 110. Here, the second R transfer function is the right element of HX retrieved from the transfer function group storage table 110. The right virtual position filter 1078 multiplies the other of the distributed third signals with the obtained second R transfer function and outputs the resultant signal to the fourth crosstalk cancellation filter 1076. Subsequently, the fourth crosstalk cancellation filter 1076 generates the $Y_4$ signal, and when the third signal is a dialog signal, the generated $Y_4$ signal is output to the second adder 103C as the third R signal using the selector 1074.

[Advantageous Effects, etc.]

As compared to the acoustic signal processing device 10C according to Embodiment 3, the acoustic signal processing device 10D according to the present embodiment further includes: a transfer function group storage table in which the transfer function HX of sounds reaching the both ears of the listener from the loudspeaker position X is stored for each loudspeaker position; and a position information storage in which loudspeaker position information for specifying the loudspeaker positions allocated to the second signal and/or the third signal is stored; these are used for the crosstalk cancellation process.

With this, even in a reproduction environment with only two channel loudspeakers, when the signal is a dialog signal, the sound of this signal can be heard from the originally intended loudspeaker position for this signal.

Figure 22A:
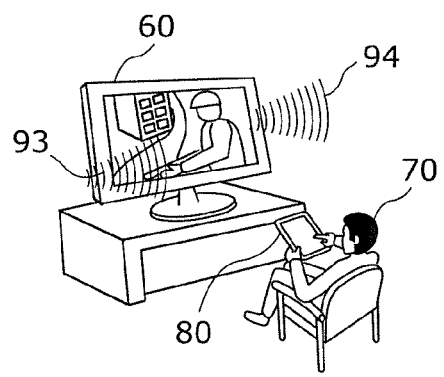
FIG. 22A is a diagram for describing the advantageous effects obtained in Embodiment 4.
Figure 22B:
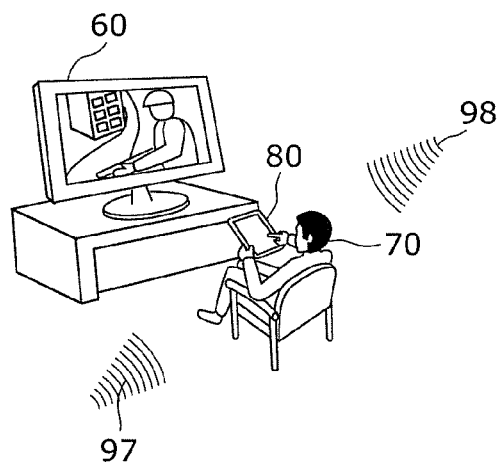
FIG. 22B is a diagram for describing the advantageous effects obtained in Embodiment 4.

FIG. 22A and FIG. 22B are diagrams for describing the advantageous effects obtained in Embodiment 4. Note that elements substantially the same as those in FIG. 16A and FIG. 16B are assigned the same reference numerals and detailed description thereof will be omitted. FIG. 22A is the same as FIG. 16A. FIG. 22B is a diagram for conceptually illustrating the localization of the second signal and the third signal when the second signal and the third signal are dialog signals.

As illustrated in FIG. 22B, when the second signal and the third signal are dialog signals, the listener 70 perceives the sounds as if a sound image 97 and a sound image 98 of the second signal and the third signal were placed at predetermined loudspeaker positions for signals that are allocated to the second signal and the third signal. Accordingly, the sound image 97 of the second signal and the sound image 98 of the third signal allow not only an improvement in the audibility of dialogue for the listener 70, but also an improvement in the sense of presence.

In this manner, the audibility of dialogue can be favorably improved in terms of the sound image localization while background sounds other than the dialogue can be maintained unchanged from the original sounds. Furthermore, since front channel signals can be eliminated, the front loudspeaker is no longer needed.

As described above, with the acoustic signal processing device 10D according to the present embodiment, it is possible to improve the audibility of dialogue with fewer loudspeakers than channels for input signals.

Other Embodiments, etc.

Although the acoustic signal processing device and the acoustic signal processing method according to an aspect of the present disclosure have been described thus far based on the embodiments, the present disclosure is not limited to the above-described embodiments. For example, other embodiments that can be realized by arbitrarily combining structural elements described in the present specification or by removing some structural elements may be embodiments of the present disclosure. Furthermore, variations obtainable through various changes to the above-described embodiments that can be conceived by a person having ordinary skill in the art without departing from the essence of the present disclosure, that is, the meaning of the recitations in the claims are included in the present disclosure.

Furthermore, the following forms may be included in the scope of one or more aspects of the present disclosure.

(1) A portion of the structural elements included in the above-described acoustic signal processing device may be a computer system configured from a microprocessor, a read only memory (ROM), a random access memory (RAM), a hard disk unit, a display unit, a keyboard, and a mouse, for example. A computer program is stored in the RAM or the hard disk unit. Each device achieves its function as a result of the microprocessor operating according to the computer program. Here, the computer program is configured of a plurality of pieced together instruction codes indicating a command to the computer in order to achieve a given function.

(2) A portion of the structural elements of each of the above-described acoustic signal processing device and method may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) A portion of the structural elements included in the above-described acoustic signal processing device may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

(4) Moreover, a portion of the structural elements included in the above-described acoustic signal processing device may also be implemented as the computer program or the digital signal recorded on recording media readable by a computer, such as a flexible disk, hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on the aforementioned recoding media.

Furthermore, a portion of the structural elements included in the above-described acoustic signal processing device may be the aforementioned computer program or the aforementioned digital signal transmitted via an electrical communication line, a wireless or wired communication line, a network represented by the Internet, data broadcasting, or the like.

(5) The present disclosure may be a method shown above. Moreover, the present disclosure may also be a computer program implementing these methods with a computer, or a digital signal of the computer program.

(6) Furthermore, the present disclosure may be a computer system including a microprocessor and a memory. The memory may store the aforementioned computer program and the microprocessor may operate according to the computer program.

(7) Moreover, by transferring the aforementioned recording medium having the aforementioned program or digital signal recorded thereon or by transferring the aforementioned program or digital signal via the aforementioned network or the like, the present disclosure may be implemented by a different independent computer system.

(8) It is also acceptable to combine the above embodiments and the above variations.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for acoustic signal processing devices and acoustic signal processing methods, particularly, for an acoustic signal processing device and an acoustic signal processing method which are applied to a television receiver or a reproduction device for DVD, Blu-ray disc recordable (BDR), etc., and in which the audibility of dialogue (such as conversations and lines) can be improved when watching and listening to video and audio content such as dramas and movies through a domestic television receiver or the like.

The invention claimed is:

1. An acoustic signal processing device for performing signal processing on an input signal group of multi-channel acoustic signals to output an output signal group including fewer channel signals than channel signals included in the input signal group, the acoustic signal processing device comprising:
a flag storage in which a first dialog flag indicating whether a first signal is a dialog signal is stored, the first signal being a front channel signal included in the input signal group;
a front signal processor which generates a first L signal and a first R signal by performing signal processing on the first signal;
a first adder which generates a fourth signal by adding a second signal and the first L signal, the fourth signal being a left channel signal included in the output signal group, the second signal being a left channel signal included in the input signal group; and
a second adder which generates a fifth signal by adding a third signal and the first R signal, the fifth signal being a right channel signal included in the output signal group, the third signal being a right channel signal included in the input signal group,
wherein the front signal processor includes:
a first sound image localizer which, when the first dialog flag indicates that the first signal is the dialog signal, performs signal processing to distribute the first signal and place distributed first signals at predetermined positions, to generate the first L signal and the first R signal; and
a second sound image localizer which, when the first dialog flag indicates that the first signal is not the dialog signal, performs signal processing to distribute the first signal and place distributed first signals at positions different from the predetermined positions, to generate the first L signal and the first R signal.

2. The acoustic signal processing device according to claim 1,
wherein the first sound image localizer performs signal processing to distribute the first signal and rotate a phase to obtain a phase difference ranging from 90 degrees to 270 degrees, to generate the first L signal and the first R signal, and
the second sound image localizer performs signal processing to distribute the first signal and rotate a phase to obtain a phase difference ranging from −90 degrees to 90 degrees, to generate the first L signal and the first R signal.

3. The acoustic signal processing device according to claim 1,
wherein the front signal processor further includes:
a dynamic range compressor which performs signal processing to compress a dynamic range, and
when the first dialog flag indicates that the first signal is the dialog signal, the front signal processor causes the dynamic range compressor to compress a dynamic range of the first signal and output the first signal to the first sound image localizer, and causes the first sound image localizer to perform signal processing to distribute the first signal having the dynamic range compressed and place distributed first signals at predetermined positions, to generate the first L signal and the first R signal.

4. The acoustic signal processing device according to claim 1,
wherein a second dialog flag and a third dialog flag are further stored in the flag storage, the second dialog flag indicating whether the second signal is the dialog flag, the third dialog flag indicating whether the third signal is the dialog flag,
the acoustic signal processing device further comprises:
a left signal processor which generates a second L signal and a second R signal by performing signal processing on the second signal; and
a right signal processor which generates a third L signal and a third R signal by performing signal processing on the third signal,
the left signal processor includes:
a first left localizer which, when the second dialog flag indicates that the second signal is the dialog signal, performs signal processing to distribute the second signal and place distributed second signals on a left side of a listener, to generate the second L signal and the second R signal; and
a second left localizer which, when the second dialog flag indicates that the second signal is not the dialog signal, performs signal processing to place the second signal at a position different from positions at which the first left localizer places the distributed second signals, to generate the second L signal and the second R signal, the right signal processor includes:
- a first right localizer which, when the third dialog flag indicates that the third signal is the dialog signal, performs signal processing to distribute the third signal and place distributed third signals on a right side of the listener, to generate the third L signal and the third R signal; and
- a second right localizer which, when the third dialog flag indicates that the third signal is not the dialog signal, performs signal processing to place the third signal at a position different from positions at which the first right localizer places the distributed third signals, to generate the third L signal and the third R signal, the first adder generates the fourth signal by adding the first L signal, the second L signal, and the third L signal, and the second adder generates the fifth signal by adding the first R signal, the second R signal, and the third R signal.

5. The acoustic signal processing device according to claim 4,
- wherein the first left localizer performs signal processing to place a sound image of the second signal on the left side of the listener by applying a crosstalk cancellation process to the distributed second signals, to generate the second L signal and the second R signal,
- the second left localizer performs signal processing to place the sound image of the second signal on the left side of the listener without applying the crosstalk cancellation process to the second signal, to generate the second L signal and the second R signal,
- the first right localizer performs signal processing to place a sound image of the third signal on the right side of the listener by applying the crosstalk cancellation process to the distributed third signals, to generate the third L signal and the third R signal, and
- the second right localizer performs signal processing to place the sound image of the third signal on the right side of the listener without applying the crosstalk cancellation process to the third signal, to generate the third L signal and the third R signal.

6. The acoustic signal processing device according to claim 5, further comprising:
- a transfer function group storage table in which a transfer function of sounds reaching both ears of the listener from each of a plurality of loudspeaker positions is stored for each of the plurality of loudspeaker positions; and
- a position information storage in which loudspeaker position information for specifying loudspeaker positions allocated to the second signal and the third signal is stored,
- wherein the first left localizer performs signal processing to place the sound image on the left side of the listener by specifying a first loudspeaker position allocated to the second signal with reference to the position information storage, obtaining a first transfer function between the first loudspeaker position and the both ears of the listener from the first loudspeaker position specified and the transfer function group storage table, applying a process of the first transfer function to the second signal, and applying the crosstalk cancellation process to the second signal, and
- the first right localizer performs signal processing to place the sound image on the right side of the listener by specifying a second loudspeaker position allocated to the third signal with reference to the position information storage, obtaining a second transfer function between the second loudspeaker position and the both ears of the listener from the second loudspeaker position specified and the transfer function group storage table, applying a process of the second transfer function to the third signal, and applying the crosstalk cancellation process to the third signal.

7. An acoustic signal processing device for performing signal processing on an input signal group of multi-channel acoustic signals to output an output signal group including fewer channel signals than channel signals included in the input signal group, the acoustic signal processing device comprising:
- a first flag storage in which a first dialog flag indicating whether a first signal is a dialog signal is stored, the first signal being a front channel signal included in the input signal group;
- a front signal processor which generates a first L signal and a first R signal by performing signal processing on the first signal;
- a first adder which generates a fourth signal by adding a second signal and the first L signal, the fourth signal being a left channel signal included in the output signal group, the second signal being a left channel signal included in the input signal group; and
- a second adder which generates a fifth signal by adding a third signal and the first R signal, the fifth signal being a right channel signal included in the output signal group, the third signal being a right channel signal included in the input signal group,
- wherein the front signal processor includes:
  - a dynamic range compressor which performs signal processing to compress a dynamic range,
  - when the first dialog flag indicates that the first signal is the dialog signal, the front signal processor distributes a signal obtained by the dynamic range compressor compressing a dynamic range of the first signal, to generate the first L signal and the first R signal, and
  - when the first dialog flag indicates that the first signal is not the dialog signal, the front signal processor distributes the first signal to generate the first L signal and the first R signal.

8. An acoustic signal processing method for performing signal processing on an input signal group of multi-channel acoustic signals to output an output signal group including fewer channel signals than channel signals included in the input signal group, the acoustic signal processing method comprising:
- generating a first L signal and a first R signal by performing signal processing on a first signal which is a front channel signal included in the input signal group;
- generating a fourth signal by adding a second signal and the first L signal, the fourth signal being a left channel signal included in the output signal group, the second signal being a left channel signal included in the input signal group; and
- generating a fifth signal by adding a third signal and the first R signal, the fifth signal being a right channel signal included in the output signal group, the third signal being a right channel signal included in the input signal group,
- wherein the generating of a first L signal and a first R signal includes:

performing, when a first dialog flag indicating whether the first signal is a dialog signal indicates that the first signal is the dialog signal, signal processing to distribute the first signal and place distributed first signals at predetermined positions, to generate the first L signal and the first R signal; and performing, when the first dialog flag indicates that the first signal is not the dialog signal, signal processing to distribute the first signal and place distributed first signals at positions different from the predetermined positions, to generate the first L signal and the first R signal.

\* \* \* \* \*